US010452399B2

(12) United States Patent
Burger et al.

(10) Patent No.: US 10,452,399 B2
(45) Date of Patent: Oct. 22, 2019

(54) BROADCAST CHANNEL ARCHITECTURES FOR BLOCK-BASED PROCESSORS

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 15/074,938

(22) Filed: Mar. 18, 2016

(65) Prior Publication Data
US 2017/0083335 A1      Mar. 23, 2017

Related U.S. Application Data

(60) Provisional application No. 62/221,003, filed on Sep. 19, 2015.

(51) Int. Cl.
*G06F 9/30* (2018.01)
*G06F 9/26* (2006.01)
(Continued)

(52) U.S. Cl.
CPC ............ *G06F 9/3016* (2013.01); *G06F 9/268* (2013.01); *G06F 9/3004* (2013.01);
(Continued)

(58) Field of Classification Search
CPC .................................................... G06F 9/3016
See application file for complete search history.

(56) References Cited

U.S. PATENT DOCUMENTS

| 4,985,832 A | 1/1991 | Grondalski |
| 5,317,734 A | 5/1994 | Gupta |

(Continued)

FOREIGN PATENT DOCUMENTS

| JP | 10-336175 | 12/1998 |
| JP | 2001-175473 | 6/2001 |
| JP | 2002-149401 | 5/2002 |
| JP | 2013-500539 | 7/2013 |

(Continued)

OTHER PUBLICATIONS

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

(Continued)

*Primary Examiner* — Michael J Metzger
(74) *Attorney, Agent, or Firm* — Klarquist Sparkman, LLP

(57) ABSTRACT

Apparatus and methods are disclosed for example computer processors that are based on a hybrid dataflow execution model. In particular embodiments, a processor core in a block-based processor comprises: one or more functional units configured to perform functions using one or more operands; an instruction window comprising buffers configured to store individual instructions for execution by the processor core, the instruction window including one or more operand buffers for an individual instruction configured to store operand values; a control unit configured to execute the instructions in the instruction window and control operation of the one or more functional units; and a broadcast value store comprising a plurality of buffers dedicated to storing broadcast values, each buffer of the broadcast value store being associated with a respective (Continued)

broadcast channel from among a plurality of available broadcast channels.

20 Claims, 16 Drawing Sheets

(51) Int. Cl.
| | | |
|---|---|---|
| G06F 9/32 | (2018.01) | |
| G06F 9/345 | (2018.01) | |
| G06F 9/35 | (2018.01) | |
| G06F 9/38 | (2018.01) | |
| G06F 9/46 | (2006.01) | |
| G06F 9/52 | (2006.01) | |
| G06F 11/36 | (2006.01) | |
| G06F 12/0806 | (2016.01) | |
| G06F 12/0862 | (2016.01) | |
| G06F 12/1009 | (2016.01) | |
| G06F 13/42 | (2006.01) | |
| G06F 15/78 | (2006.01) | |
| G06F 15/80 | (2006.01) | |
| G06F 9/355 | (2018.01) | |
| G06F 12/0811 | (2016.01) | |
| G06F 12/0875 | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | | |
|---|---|---|---|
| 5,333,320 A | 7/1994 | Seki | |
| 5,615,350 A | 3/1997 | Hesson | |
| 5,669,001 A | 9/1997 | Moreno | |
| 5,729,228 A | 3/1998 | Franaszek et al. | |
| 5,790,822 A | 8/1998 | Sheaffer et al. | |
| 5,796,997 A | 8/1998 | Lesartre et al. | |
| 5,826,049 A | 10/1998 | Ogata et al. | |
| 5,845,103 A | 12/1998 | Sodani et al. | |
| 5,905,893 A | 5/1999 | Worrell | |
| 5,917,505 A | 6/1999 | Larson | |
| 5,930,491 A * | 7/1999 | Hilgendorf | G06F 9/3017 712/209 |
| 5,943,501 A | 8/1999 | Burger et al. | |
| 6,016,399 A | 1/2000 | Chang | |
| 6,061,776 A | 5/2000 | Burger et al. | |
| 6,112,019 A * | 8/2000 | Chamdani | G06F 9/3836 712/214 |
| 6,161,170 A | 12/2000 | Burger et al. | |
| 6,164,841 A | 12/2000 | Mattson et al. | |
| 6,178,498 B1 | 1/2001 | Sharangpani et al. | |
| 6,240,510 B1 | 5/2001 | Yeh et al. | |
| 6,282,708 B1 | 8/2001 | Augusteijn et al. | |
| 6,295,599 B1 | 9/2001 | Hansen et al. | |
| 6,295,616 B1 | 9/2001 | O'Connell et al. | |
| 6,314,493 B1 | 11/2001 | Luick | |
| 6,353,883 B1 | 3/2002 | Grochowski et al. | |
| 6,493,820 B2 | 12/2002 | Akkary et al. | |
| 6,529,922 B1 | 3/2003 | Hoge | |
| 6,615,340 B1 | 9/2003 | Wilmot | |
| 6,625,773 B1 | 9/2003 | Boivie et al. | |
| 6,662,294 B1 | 12/2003 | Kahle et al. | |
| 6,820,192 B2 | 11/2004 | Cho et al. | |
| 6,891,828 B2 | 5/2005 | Ngai | |
| 6,892,292 B2 | 5/2005 | Henkel et al. | |
| 6,918,032 B1 | 7/2005 | Abdallah et al. | |
| 6,965,969 B2 | 11/2005 | Burger et al. | |
| 6,980,209 B1 | 12/2005 | Donham et al. | |
| 6,988,183 B1 | 1/2006 | Wong | |
| 7,032,217 B2 | 4/2006 | Wu | |
| 7,085,913 B2 | 8/2006 | Harding et al. | |
| 7,085,919 B2 | 8/2006 | Grochowski et al. | |
| 7,095,343 B2 | 8/2006 | Xie et al. | |
| 7,299,458 B2 | 11/2007 | Hammes | |
| 7,302,543 B2 | 11/2007 | Lekatsas et al. | |
| 7,320,037 B1 | 1/2008 | Maturi et al. | |
| 7,380,038 B2 | 5/2008 | Gray | |
| 7,487,340 B2 | 2/2009 | Luick | |
| 7,599,998 B2 | 10/2009 | Galbraith et al. | |
| 7,624,386 B2 | 11/2009 | Robison | |
| 7,676,650 B2 | 3/2010 | Ukai | |
| 7,676,669 B2 | 3/2010 | Ohwada | |
| 7,836,289 B2 | 11/2010 | Tani | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 7,970,965 B2 | 6/2011 | Kedem et al. | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,180,997 B2 | 5/2012 | Burger et al. | |
| 8,201,024 B2 | 6/2012 | Burger et al. | |
| 8,250,555 B1 | 8/2012 | Lee et al. | |
| 8,312,452 B2 | 11/2012 | Neiger et al. | |
| 8,321,850 B2 | 11/2012 | Bruening et al. | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,583,895 B2 | 11/2013 | Jacobs et al. | |
| 8,812,821 B2 | 8/2014 | Hansen et al. | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 2001/0032308 A1 | 10/2001 | Grochowski et al. | |
| 2002/0016907 A1 | 2/2002 | Grochowski et al. | |

(56) References Cited

U.S. PATENT DOCUMENTS

| | | |
|---|---|---|
| 2002/0121555 A1 | 9/2002 | Cipolla et al. |
| 2002/0126661 A1 | 9/2002 | Ngai |
| 2002/0126671 A1 | 9/2002 | Ellis et al. |
| 2003/0023959 A1 | 1/2003 | Park |
| 2003/0070062 A1 | 4/2003 | Krishnan et al. |
| 2003/0088694 A1 | 5/2003 | Patek et al. |
| 2003/0088759 A1 | 5/2003 | Wilkerson |
| 2004/0076155 A1 | 4/2004 | Yajnik et al. |
| 2004/0083468 A1 | 4/2004 | Ogawa et al. |
| 2004/0193849 A1 | 9/2004 | Dundas |
| 2004/0216095 A1 | 10/2004 | Wu |
| 2005/0005084 A1 | 1/2005 | Burger et al. |
| 2005/0172277 A1 | 8/2005 | Chheda et al. |
| 2005/0204348 A1 | 9/2005 | Horning et al. |
| 2006/0090063 A1 | 4/2006 | Theis |
| 2007/0165547 A1 | 7/2007 | Lindwer et al. |
| 2007/0226735 A1 | 9/2007 | Nguyen et al. |
| 2007/0239975 A1 | 10/2007 | Wang |
| 2007/0260854 A1 | 11/2007 | Smith et al. |
| 2007/0288733 A1 | 12/2007 | Luick |
| 2008/0109637 A1 | 5/2008 | Martinez et al. |
| 2009/0013135 A1 | 1/2009 | Burger et al. |
| 2009/0013160 A1 | 1/2009 | Burger et al. |
| 2009/0019263 A1 | 1/2009 | Shen et al. |
| 2009/0106541 A1 | 4/2009 | Mizuno et al. |
| 2009/0158017 A1 | 6/2009 | Mutlu et al. |
| 2009/0172371 A1 | 7/2009 | Joao et al. |
| 2009/0201928 A1 | 8/2009 | Chen et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2011/0010525 A1 | 1/2011 | Binkert et al. |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2012/0158647 A1 | 6/2012 | Yadappanavar et al. |
| 2012/0246657 A1 | 9/2012 | Abdallah |
| 2012/0303933 A1 | 11/2012 | Manet et al. |
| 2012/0311306 A1 | 12/2012 | Mushano |
| 2013/0198499 A1 | 8/2013 | Dice et al. |
| 2014/0006714 A1 | 1/2014 | Cherukuri et al. |
| 2014/0181475 A1 | 6/2014 | Abdallah |
| 2014/0189239 A1 | 7/2014 | Hurn et al. |
| 2014/0372736 A1 | 12/2014 | Greenhalgh |
| 2015/0006452 A1 | 1/2015 | Kim et al. |
| 2015/0026444 A1 | 1/2015 | Anderson et al. |
| 2015/0067662 A1 | 3/2015 | Palalau |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2016/0203081 A1 | 7/2016 | Kimura |
| 2016/0306772 A1 | 10/2016 | Burger et al. |
| 2016/0378483 A1 | 12/2016 | Burger et al. |
| 2017/0083318 A1 | 3/2017 | Burger et al. |
| 2017/0083319 A1 | 3/2017 | Burger et al. |
| 2017/0083320 A1 | 3/2017 | Burger et al. |
| 2017/0083341 A1 | 3/2017 | Burger et al. |

FOREIGN PATENT DOCUMENTS

| | | |
|---|---|---|
| WO | WO 03/017562 | 2/2003 |
| WO | WO 2006/127856 | 11/2006 |
| WO | WO 2014/193878 | 12/2014 |

OTHER PUBLICATIONS

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Kavi, et al., "Concurrency, Synchronization, Speculation—the Dataflow Way", In Journal of Advances in Computers, vol. 96, Nov. 23, 2013, pp. 1-41.

Liu, "Hardware Techniques to Improve Cache Efficiency", In Dissertation of the University of Texas at Austin, May 2009, 189 pages.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Munshi, et al., "A Parameterizable SIMD Stream Processor", In Proceedings of Canadian Conference on Electrical and Computer Engineering, May 1, 2005, pp. 806-811.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Pengfei et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Roesner, "Counting Dependence Predictors," In Undergraduate Honors Thesis, May 2, 2008, 25 pages.

Sibi et al., "Scaling Power and Performance via Processor Composability," University of Texas at Austin technical report No. TR-10-14 (2010), 20 pages.

Souza et al., "Dynamically Scheduling VLIW Instructions", In Journal of Parallel and Distributed Computing, vol. 60, Jul. 2000, pp. 1480-1511.

Tamches et al., "Dynamic Kernel Code Optimization," In Workshop on Binary Translation, 2001, 10 pages.

Taylor et al., "Scalar Operand Networks: On-chip Interconnectg for ILP in Partitioned Architectures," Proceedings of the 9th International Symposium on High-Performance Computer Architecture, Feb. 2003, pp. 341-353.

(56) References Cited

OTHER PUBLICATIONS

Tutsch et al., "MLMIN: A Multicore Processor and Parallel Computer Network Topology for Multicast," vol. 35, Issue 12, Dec. 2008, pp. 3807-3821.

Wang et al., "Power-driven Design of Router Microarchitectures in On-chip Networks," Proceedings of the 36th Annual IEEE/ACM International Symposium on Microarchitecture, Feb. 2003, pp. 105-116.

Wikipedia, "Network on Chip," retrieved from http://en.widipedia/wiki/Network_On_Chip, Sep. 15, 2009, 4 pages.

Wu et al., "Block Based Fetch Engine for Superscalar Processors", In Proceedings of the 15th International Conference on Computer Applications in Industry and Engineering, Nov. 7, 2002, 4 pages.

Zmily, "Block-Aware Instruction Set Architecture", In Doctoral Dissertation, Jun. 2007, 176 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

International Search Report and Written Opinion dated Dec. 15, 2016, from International Patent Application No. PCT/US2016/051412, 10 pp.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

"Explicit Data Graph Execution", Retrieved on: Aug. 6, 2015, Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

Junkins, "The Compute Architecture of Intel® Processor Graphics Gen9", Published on: Aug. 14, 2015, Available at: https://software.intel.com/sites/default/files/managed/c5/9a/The-Compute-Architecture-of-Intel-Processor-Graphics-Gen9-v1d0.pdf.

Keckler et al., "Tera-Op Reliable Intelligently Adaptive Processing System (TRIPS)," In AFRL-IF-WP-TR-2004-1514, document dated Apr. 2004, 29 Pages.

Kim et al., "Composable Lightweight Processors", In Proceedings of the 40th Annual IEEE/ACM International Symposium on Microarchitecture, Dec. 1, 2007, 13 pages.

Kozumplik, et al., "TRIPS to the Semantic EDGE", Retrieved on: Sep. 22, 2015, Available at: http://vbn.aau.dk/ws/files/61072300/1212050422.pdf.

Leibson et al., "Configurable Processors: A New Era in Chip Design", In Journal of Computer, vol. 38, Issue 7, Jul. 2015, pp. 51-59.

Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).

Maher, "Atomic Block Formation for Explicit Data Graph Execution Architectures", In Dissertation of Doctor of Philosophy, Aug. 2010, 185 pages.

McDonald et al., "TRIPS Processor Reference Manual," In Technical Report TR-05-19, document marked Mar. 10, 2005, 194 pages.

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

Melvin et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Nagarajan et al., "Critical Path Analysis of the TRIPS Architecture," In IEEE International Symposium on Performance Analysis of Systems and Software, Mar. 19, 2006, 11 pages.

Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).

Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.

Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.

Sankaralingam, "Polymorphous Architectures: A Unified Approach for Extracting Concurrency of Different Granularities", In Doctoral Dissertation of Philosophy, Aug. 2007, 276 pages.

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.

Sethumadhavan et al., "Design and Implementation of the TRIPS Primary Memory System," In Proceedings of International Conference on Computer Design, Oct. 1, 2006, 7 pages.

Smith et al., "Compiling for EDGE Architectures," In Proceedings of International Symposium on Code Generation and Optimization, Mar. 26, 2006, 11 pages.

Smith et al., "Dataflow Predication", In Proceedings of 39th Annual IEEE/ACM International Symposium on Microarchitecture, Dec. 9, 2006, 12 pages.

(56) References Cited

OTHER PUBLICATIONS

Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Voicu et al., "3D Stacked Wide-Operand Adders: A Case Study", In Proceedings of the 24th International Conference on Application-specific Systems, Architectures and Processors, Jun. 5, 2013, 9 pages.
August, et al., "A Framework for Balancing Control Flow and Predication", In IEEE/ ACM 30th Annual International Symposium on Microarchitecture, Dec. 3, 1997, 12 Pages.
Chang, et al., "Using Predicated Execution to Improve the Performance of a Dynamically Scheduled Machine with Speculative Execution", In International Journal of Parallel Programming, vol. 24, Issue 3, Jun. 1996, 11 Page.
Chuang, et al., "Predicate Prediction for Efficient Out-of-Order Execution", In Proceedings of the 17th Annual International Conference on Supercomputing, Jun. 23, 2003, 10 Pages.
Coons, et al., "Optimal Huffman Tree-Height Reduction for Instruction-Level Parallelism", In Technical Report TR-08-34, Aug. 2007, 26 Pages.
Ebcioglu, et al., "An Eight-Issue Tree-VLIW Processor for Dynamic Binary Translation", In Proceedings of the International Conference on Computer Design, Nov. 1998, 9 Pages.
Ferrante, et al., "The Program Dependence Graph and Its Use in Optimization", In Proceedings of ACM Transactions on Programming Languages and Systems, vol. 9, Issue 3, Jul. 1, 1987, 31 Pages.
Final Office Action dated Jul. 9, 2018, from U.S. Appl. No. 14/757,944, 18 pp.
Final Office Action dated Dec. 31, 2018, from U.S. Appl. No. 14/942,345, 14 pp.
Final Office Action dated Dec. 31, 2018, from U.S. Appl. No. 14/942,557, 16 pp.
Havanki, et al., "Treegion Scheduling for Wide Issue Processors", In Proceedings of the 4th International Symposium on High-Performance Computer Architecture, Feb. 1, 1998, 11 Pages.
Huh, et al., "A NUCA Substrate for Flexible CMP Cache Sharing", In Proceedings of 19th International Conference on Supercomputing, Jun. 20, 2005, 10 Pages.
"International Search Report and Written Opinion Issued in PCT Application No. PCT/US2016/051207", dated Dec. 16, 2016, 11 Pages.
Mahlke, et al., "Effective Compiler Support for Predicated Execution Using the Hyperblock", In Proceedings of the 25th Annual International Symposium on Microarchitecture, Dec. 1992, 10 Pages.
Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.
Mai, et al., "Smart Memories: A Modular Reconfigurable Architecture", In Proceedings of the 27th International Symposium on Computer Architecture, Jun. 14, 2000, 11 Pages.
McDonald, et al., "The Design and Implementation of the TRIPS Prototype Chip", Retrieved From: http://www.cs.utexas.edu/-trips/talks/hotchips05.pdf, Aug. 17, 2005, 24 Pages.

Moreno, et al., "Scalable Instruction-level Parallelism through Tree-Instructions", In Proceedings of the 11th International Conference on Supercomputing, Jul. 11, 1997, 14 Pages.
Netto, et al., "Code Compression to Reduce Cache Accesses", In Technical Report-IC-03-023, Nov. 2003, 15 Pages.
Office Action dated Sep. 21, 2017, from U.S. Appl. No. 14/757,944, 21 pp.
Office Action dated Jan. 11, 2019, from U.S. Appl. No. 14/757,941, 16 pp.
Office Action dated Jan. 18, 2019, from U.S. Appl. No. 14/942,461, 9 pp.
Office Action dated Dec. 4, 2018, from U.S. Appl. No. 15/073,365, 13 pp.
Pan, et al., "High Performance, Variable-Length Instruction Encodings", In Doctoral Dissertation of Massachusetts Institute of Technology, May 2002, 53 Pages.
Parcerisa, et al., "Design of Clustered Superscalar Microarchitectures", In Thesis Submitted to Polytechnic University of Catalonia, Barcelona (Spain), Apr. 2004, 28 Pages.
Pnevmatikatos, et al., "Guarded Execution and Branch Prediction in Dynamic ILP Processors", In Proceedings of the 21st Annual International Symposium on Computer Architecture, Apr. 1994, 11 Pages.
Quinones, et al., "Improving Branch Predication and Predicated Execution in Out-of-Order Processors", Feb. 2007, 10 Pages.
Quinones, et al., "Selective Predicate Prediction for Out-of-Order Processors", In Proceedings of the 20th Annual International Conference on Supercomputing, Jun. 28, 2009, 9 Pages.
Ranganathan, Nitya, "Control Flow Speculation for Distributed Architectures", In Dissertation Presented to the Faculty of the Graduate School of The University of Texas at Austin, May 2009, 40 Pages.
Ross, et al., "A Hamming Distance Based VLIW/EPIC Code Compression Technique", In Proceedings of the International Conference on Compilers, Architecture, and Synthesis for Embedded Systems, Sep. 22, 2004, 8 Pages.
Salzman et al., Abstract of *The Art of Debugging with GDB and DDD*, 27 pp. (Sep. 2008).
Sankaralingam, et al., "Universal Mechanisms for Data-Parallel Architectures", In Proceedings of the 36th International Symposium on Microarchitecture, Dec. 3, 2003, 12 Pages.
Simon, et al., "Incorporating Predicate Information Into Branch Predictors", In Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International Conference on Architectural Support for Programming Languages and Operating Systems Homepage, Apr. 1991, 8 Pages.
Uht, et al., "Disjoint Eager Execution: An Optimal Form of Speculative Execution", In Proceedings of the 28th International Symposium on Microarchitecture, Nov. 1995, 13 Pages.
Wikipedia, "Very Long Instruction Word," retrieved from http://en.wikipedia.org/wiki/Verylong_instruction_word, 7 pp. (Feb. 2013).
Wilson, et al., "Designing High Bandwidth On-Chip Caches", In Proceedings of the 24th Annual International Symposium on Computer Architecture, Jun. 1997, 12 Pages.
Xie, et al., "A Code Decompression Architecture for VLIW Processors", In Proceedings of 34th ACM/IEEE International Symposium on Microarchitecture, Dec. 1, 2001, 10 Pages.

* cited by examiner

BROADCAST CHANNEL ARCHITECTURES FOR BLOCK-BASED PROCESSORS

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

FIELD

This application relates to processors for performing computations. In particular, this application relates to block-based processor architectures (BB-ISAs), including explicit data graph execution (EDGE) architectures.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Example apparatus and methods for block-based processor architectures (BB-ISAs), including explicit data graph execution (EDGE) architectures, are disclosed herein. The described apparatus and methods can be implemented separately, or in various combinations with each other. As will be described more fully below, the disclosed technology can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

More specifically, apparatus and methods are disclosed for broadcasting one or more operand values for use by other instructions in an instruction window of a block-based processor implementing a dataflow instruction set architecture. In some implementations, for example, an instruction can perform an operation whose result is broadcast on a broadcast channel; that broadcast channel, in turn, can be made available for use by other instructions (e.g., all other instructions) in the instruction window. In this way, the result of an operation can be fanned out for use by other instructions. The broadcast channel hardware can comprise, for example, a broadcast data bus that transmits broadcast data along with an indication of its associated broadcast channel on a broadcast control bus (e.g., on a processor-clock-cycle-by-processor-clock-cycle basis) and that is monitored by hardware (listening units) associated with each instruction in the instruction window. When broadcast control data is transmitted on the broadcast control bus that is recognized by a particular listening unit as being used by a particular instruction, the broadcast data from the broadcast data bus can be copied into a local buffer for that instruction. In other embodiments, the broadcast data can be stored in a dedicated buffer that temporarily stores the broadcast values separate from the buffers for the individual instructions and directly feeds the functional units when needed during instruction execution.

In one example embodiment, a processor core in a block-based processor (e.g., having multiple processor cores) comprises one or more functional units configured to perform functions for one or more operands; an instruction window comprising buffers configured to store individual instructions for execution by the processor core; and a control unit configured to execute the instructions in the instruction window and control operations of the one or more functional units. In such embodiments, the instruction window can include, for a respective instruction to be executed by the processor core, (a) a buffer dedicated to storing the respective instruction; (b) a buffer dedicated to storing one or more operands for use by the respective instruction; and (c) a listening unit configured to monitor a broadcast data bus and/or a broadcast control bus shared among instructions in the instruction window and, when instructed by data from or a control signal generated from the respective instruction, detect values broadcast on the broadcast data bus and conditionally copy the values into the buffer dedicated to storing the operand.

In another example embodiment, a processor core in a block-based processor having multiple processor cores comprises: one or more functional units configured to perform functions for one or more instructions; an instruction window comprising buffers configured to store individual instructions for execution by the processor core, the instruction window further comprising one or more operand buffers for individual instructions configured to store operand values; and a control unit configured to execute the instructions in the instruction window and control operation of the one or more functional units. The block-based processor can further comprise a broadcast value store comprising a plurality of buffers dedicated to storing broadcast values, each buffer of the broadcast value store being associated with a respective broadcast channel from among a plurality of available broadcast channels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

I. General Considerations

Figure 1:
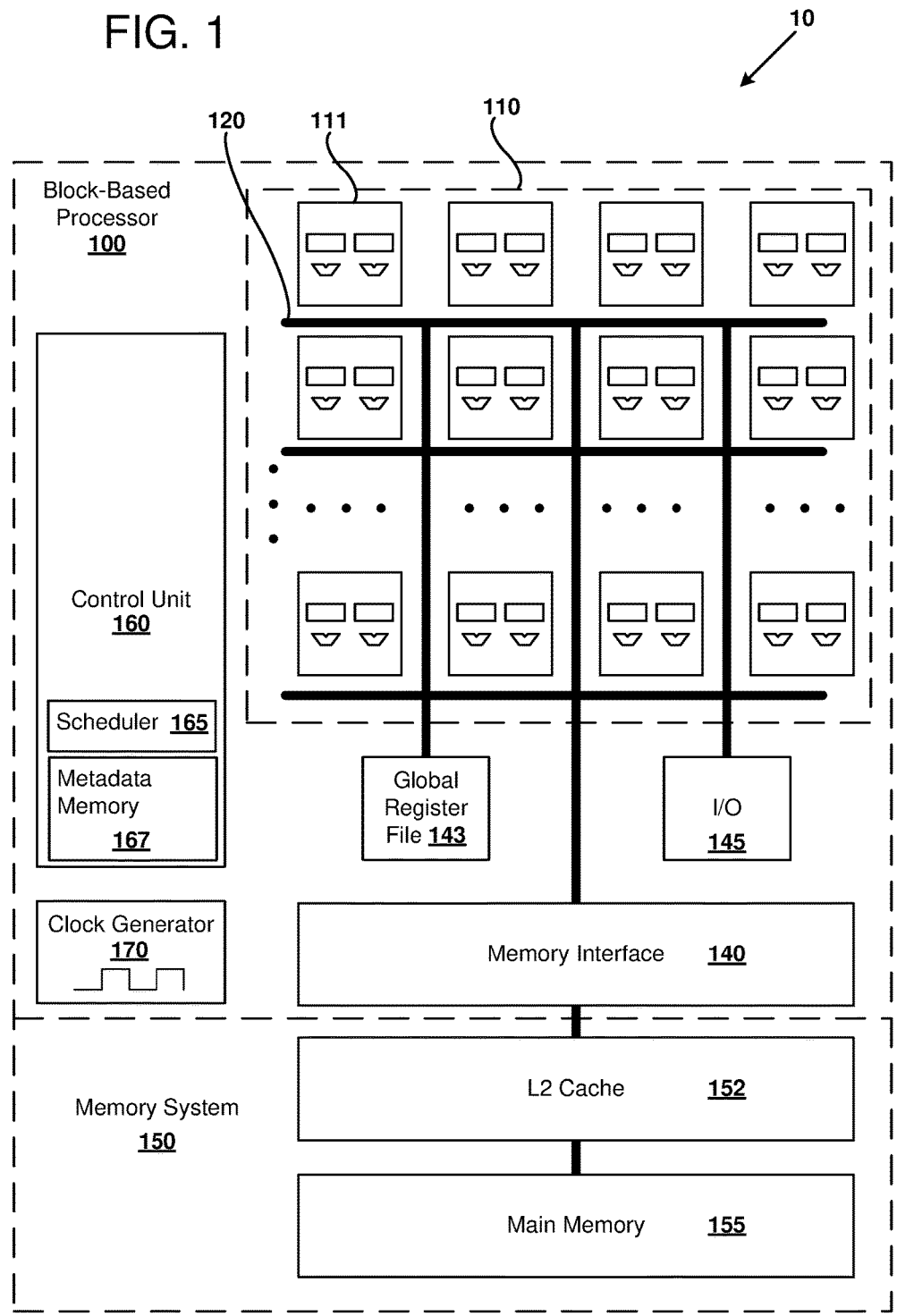
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Certain ones of the disclosed methods can be implemented as computer-executable instructions stored on one or more computer-readable media (e.g., computer-readable media, such as one or more optical media discs, volatile memory devices (such as DRAM or SRAM), or nonvolatile memory or storage devices (such as hard drives, Flash memory, or NVRAM)) and executed on a computer (e.g., computing devices, including servers, desktops, laptops, smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology is possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler allocation refers to directing operation of instruction blocks, including initiating instruction block mapping, fetching, decoding, executing, committing, aborting, idling, and refreshing an instruction block. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes metadata memory 167, which can be used to store data indicating execution flags for an instruction block.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
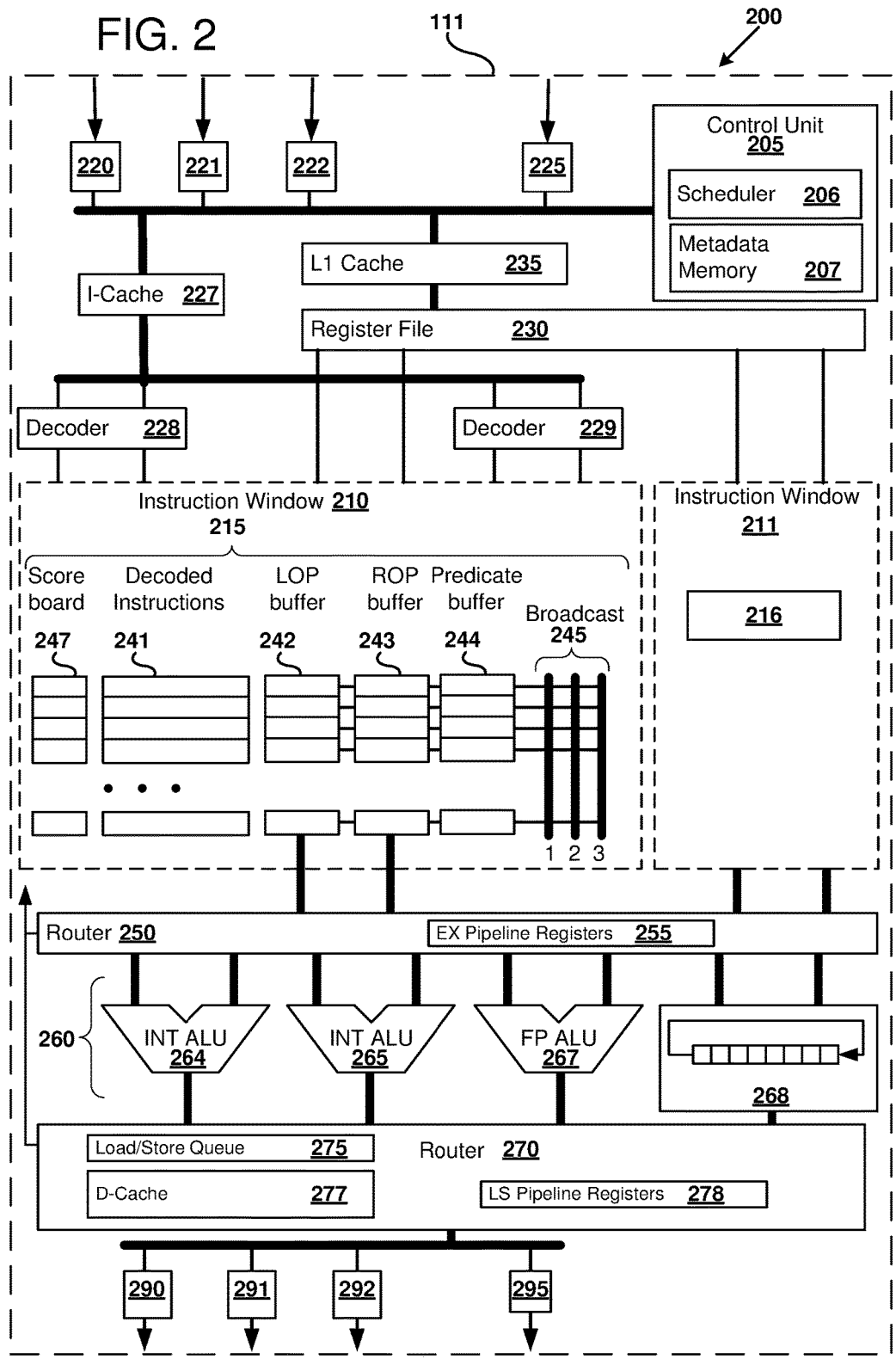
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using block branch metadata representing control flow and exit points, allocation and de-allocation of cores for performing instruction processing, control of input data and output data between any of the cores, register files, the memory interface 140, and/or the I/O interface 145.

The control unit 205 can also include branch prediction circuitry that generates predictions of which instruction block(s) will be executed next. The branch prediction circuitry predicts which of a plurality of exit points of a block will be taken, and sends a signal that the control unit 205 uses to fetch, decode, and execute the next instruction block predicted. Any suitable branch prediction technique can be used. In some examples, a compiler or interpreter that generates the block-based processor instructions can include metadata in the block header or other location with hints for the branch prediction. In some examples, branch prediction is performed dynamically. For example, if an exit point is taken once, twice, or another number of times, then that exit point is designated as the predicted action for the next execution instance of the instruction block. In some examples, a table of instruction blocks and corresponding most likely exit points is maintained (e.g., in a user-visible, or non-user visible memory accessible to the control unit 205). In some examples, the predicted next instruction block is fetched, or fetched and decoded, but not executed until the previous block has committed. In some examples, block operands (e.g., from memory and/or registers) can be pre-fetched in addition to the next block instructions and block header. In some examples, the predicted next instruction block is also executed, even before the previous block has committed. In the event that the prediction is not correct (e.g., because the branch prediction was incorrect, or an exception occurs) the control unit 205 flushes the processor core speculatively executing the next predicted block, so that the processor state appears as if the incorrect branch was not taken.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, control flow and metadata can be stored in metadata memory 207 that is accessible by the control unit 205 but that is not architecturally visible.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 (also referred to as the instruction window store 215, 216) located in each respective instruction window 210 and 211. Further, each of the decoders 228 and 229 can send data to the control unit 205, for example, to configure operation of the processor core 111 according to execution flags specified in an instruction block header or in an instruction.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, DRAM, or other forms of memory storage. The ISA specification for a given processor, for example processor 100, specifies how registers within the register file 230 are defined and used.

In some examples, the processor 100 includes a global register file 143 that is shared by a plurality of the processor cores. In some examples, individual register files associated with a processor core (e.g., instances of register file 230) can be combined to form a larger file, statically or dynamically, depending on the processor ISA and configuration.

As shown in FIG. 2, the instruction window store 215 (sometimes referred to simply as the store 215) of the instruction window 210 includes a number of decoded instructions 241, a left operand (LOP) buffer 242, a right operand (ROP) buffer 243, a predicate buffer 244, three broadcast channels 245, and an instruction scoreboard 247. (The decoded instructions 241, left operand 242, right operand 243, predicate 244, broadcast channel 245, and instruction scoreboard 247 can be stored in respective "buffers" (sometimes referred to as "memory buffers") comprising one or more flip-flops, latches, DRAM cells, SRAM cells, or other storage elements.) In some examples, the buffers include control logic to implement queueing (e.g., last-in first-out (LIFO) or first-in first-out (FIFO) buffers), stacks, content addressable memories (CAMs), or other storage configurations. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. In certain implementations, instruction operands and predicates are read from the operand buffers 242 and 243, and predicate buffer 244, respectively, not the register file. The instruction scoreboard 247 can include a buffer for predicates directed to an instruction, including wire-OR logic for combining predicates sent to an instruction by multiple instructions.

The instruction window store 216 of the second instruction window 211 stores similar instruction information (decoded instructions, operands, and scoreboard) as the instruction window store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s)) using the scoreboard 247. When all of the input operands and predicates for a particular decoded instruction are ready, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encode a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the instruction window store 215 of the instruction window 210. Rather, the instruction scoreboard 247 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For memory access instructions encoded with load store identifiers (LSIDs), the execution order will also follow the priorities enumerated in the instruction LSIDs, or by executed in an order that appears as if the instructions were executed in the specified order. Information stored in the scoreboard 247 can include, but is not limited to, the associated instruction's execution predicate(s) (such as whether the instruction is waiting for a predicate bit to be calculated and whether the instruction executes if the predicate bit is TRUE or FALSE), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In other examples, multiple instructions can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the instruction window store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can include graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include a load/store queue 275, which can be used to issue memory instructions, a data cache 277, which stores data being input to or output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a TRUE or FALSE condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
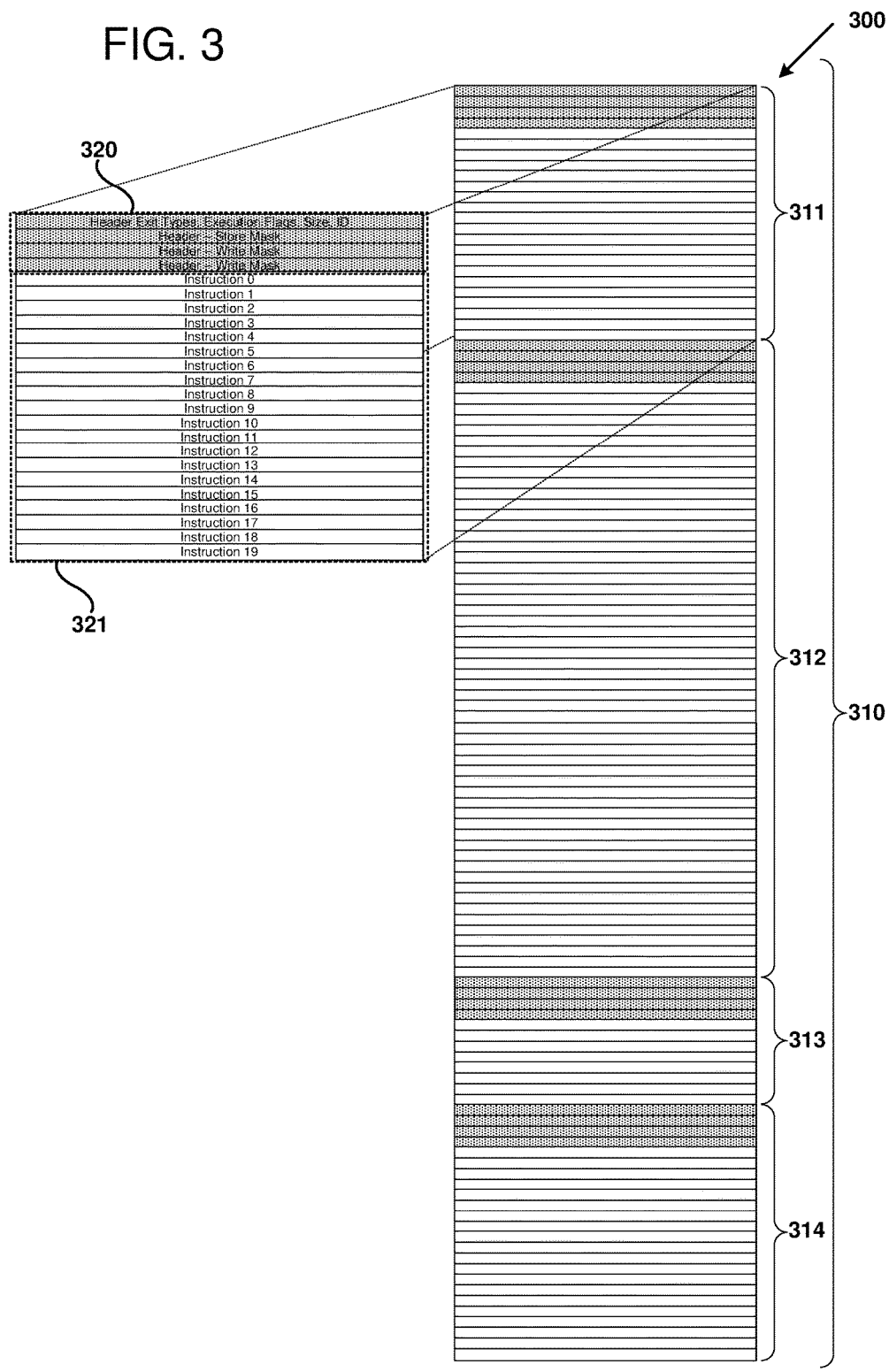
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. For example, for a block with eight memory access instructions, a store mask 01011011 would indicate that there are three memory store instructions (bits 0, corresponding to LSIDs 0, 2, and 5) and five memory load instructions (bits 1, corresponding to LSIDs 1, 3, 4, 6, and 7). The instruction block header can also include a write mask, which identifies which register(s) in a register file (e.g., the register file 230 or the global register file 143, depending on the architecture) the associated instruction block will write. In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can analyze load store identifiers of instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder and stored in a write mask register. The store mask and the write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and metadata stored in a metadata memory (e.g., metadata memory 167 or 207). In some examples, data such as the number of cores to allocate to core fusion or vector mode operations (e.g., for all or a specified instruction block) can be stored in a control register. In some examples, the control register is not architecturally visible. In some examples, access to the control register is configured to be limited to processor operation in a supervisory mode or other protected mode of the processor.

VI. Example Block Instruction Target Encoding

Figure 4:
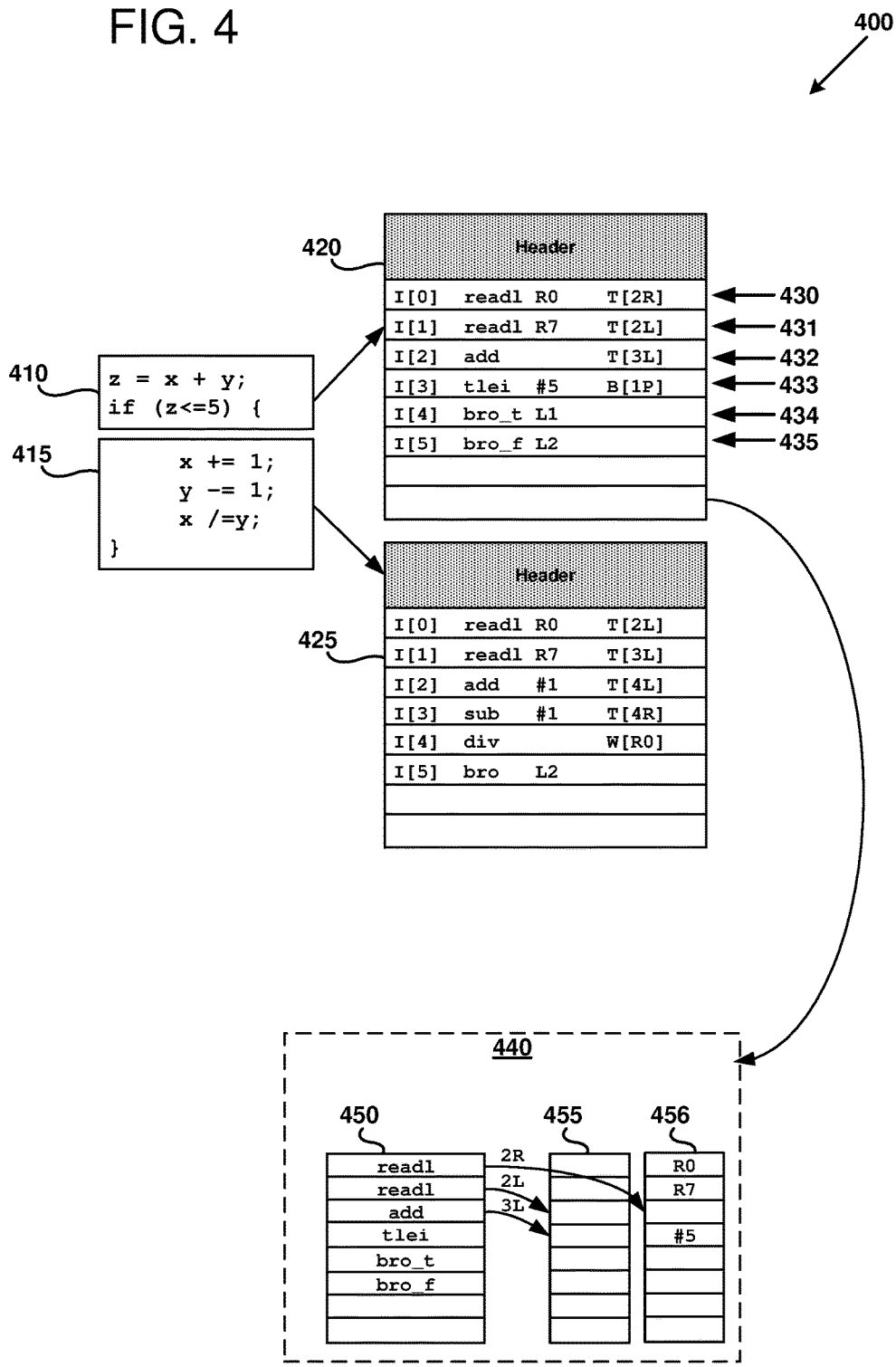
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READL instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the READL instruction is the only instruction that reads from the user portion of the register file (e.g., register file 230 or global register file 143); however, any instruction can target the register file. A READH instruction is used to access the system portion of the register file. When the ADD instruction 432 receives the result of both register reads it will become ready and execute. It is noted that the present disclosure sometimes refers to the right operand as OP0 and the left operand as OP1, respectively.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated as an array 450 of instruction nodes and their corresponding operand targets 455 and 456 (which represent the left and right operand buffers (e.g., as shown as buffers 242 and 243 in FIG. 2). This illustrates the correspondence between the block instructions 420, the corresponding instruction window entries, and the underlying dataflow graph represented by the instructions. Here decoded instructions READL 430 and READL 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

Figure 5:
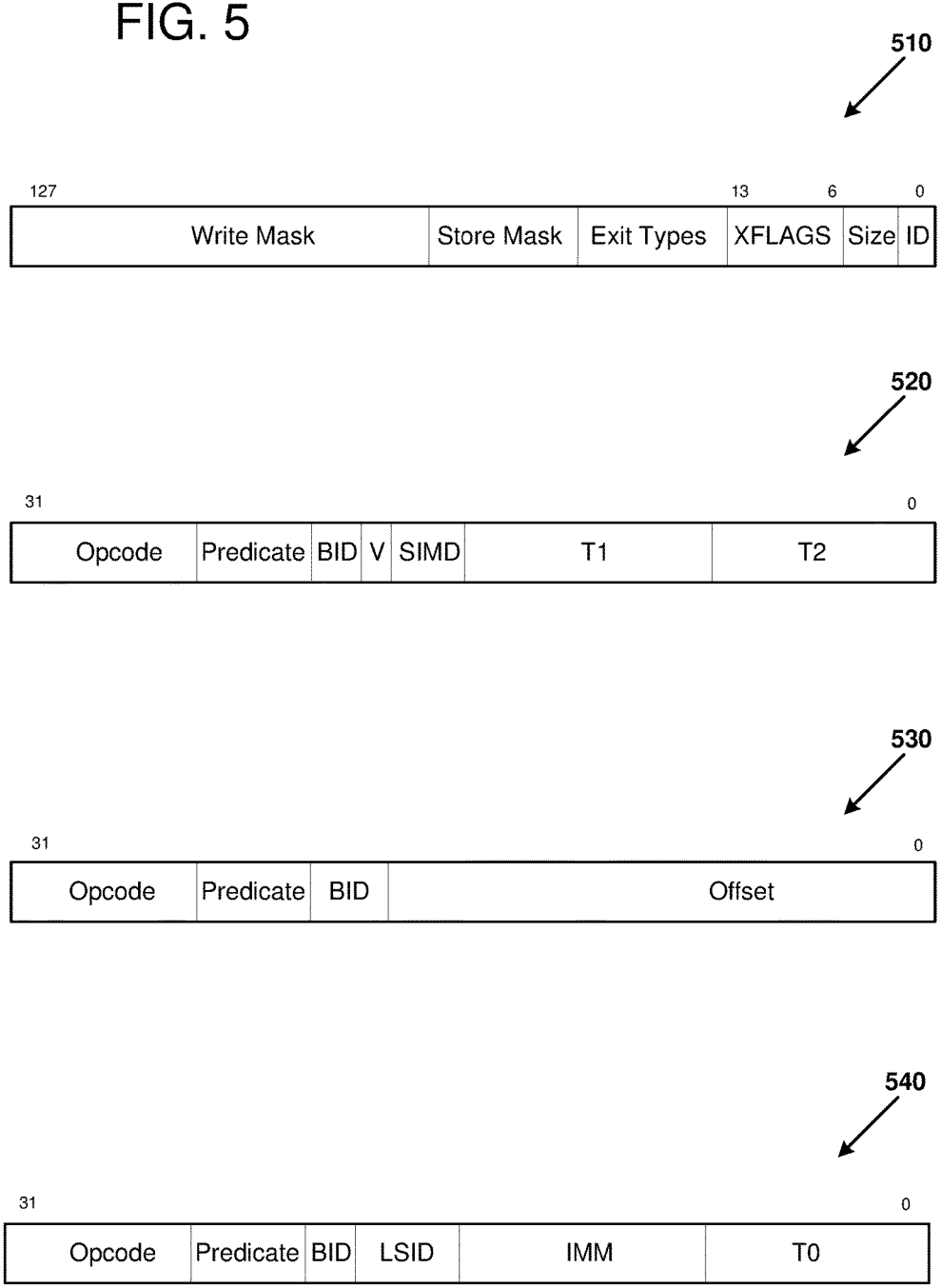
FIG. 5 illustrates block-based processor headers and instructions, as can be used in some examples of the disclosed technology.

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields, an instruction block size field, and an instruction header ID bit (the least significant bit of the instruction header).

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution. In some examples of the disclosed technology, bit 6 indicates vector mode operation, bit 8 indicates whether to inhibit a memory dependence predictor, and bit 13 indicates whether to force deterministic execution (e.g., execution in sequential order, or in a not-strictly sequential order that does not vary based on data dependencies or other varying operation latencies).

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. In the illustrated embodiment, a broadcast identifier can be encoded in the generic block instruction 520 in the BID field. The broadcast identifier can identify, for example, which one of a plurality of available broadcast channels the instruction is to use for retrieving an operand value (and can also identify that no broadcast channel is to be used). In further embodiments, additional broadcast data is included in the generic block instruction. For example, the instruction can also include an operand type field in which operand type data is included. The operand type data can identify which type of operand the data value on the broadcast channel is to be used as (e.g., as a left operand for the instruction, as a right operand for the instruction, and/or as a predicate operand for the instruction).

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "TRUE," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The broadcast ID field is also similar in format and function as described regarding the generic instruction. Further, as with the generic instruction and in certain embodiments, additional broadcast data can be included in the branch instruction 530 (e.g., operand type data for the broadcast value to be used). The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is FALSE, the instruction will not commit values calculated by the particular instruction. If the predicate value does not match the required predicate, the instruction does not issue. For example, a BRO_F (predicated FALSE) instruction will issue if it is sent a FALSE predicate value, but will not issue if it is sent a TRUE predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), a load store ID field (LSID), an immediate field (IMM) offset field, and a target field. The opcode, broadcast, predicate fields are similar in format and function as described regarding the generic instruction. The broadcast ID field is also similar in format and function as described regarding the generic instruction. Further, as with the generic instruction and in certain embodiments, additional broadcast data can be included in the branch instruction 530 (e.g., operand type data for the broadcast value to be used). Execution of a particular instruction can be predicated on the result of a previous instruction (e.g., a comparison of two operands). If the predicate is FALSE, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory). The LSID field specifies a relative order for load and store instructions within a block. In other words, a higher-numbered LSID indicates that the instruction should execute after a lower-numbered LSID. In some examples, the processor can determine that two load/store instructions do not conflict (based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being TRUE, and second load/store instruction is predicated on a value p being FALSE, then each instruction can have the same LSID value.

VIII. Example Processor State Diagram

Figure 6:
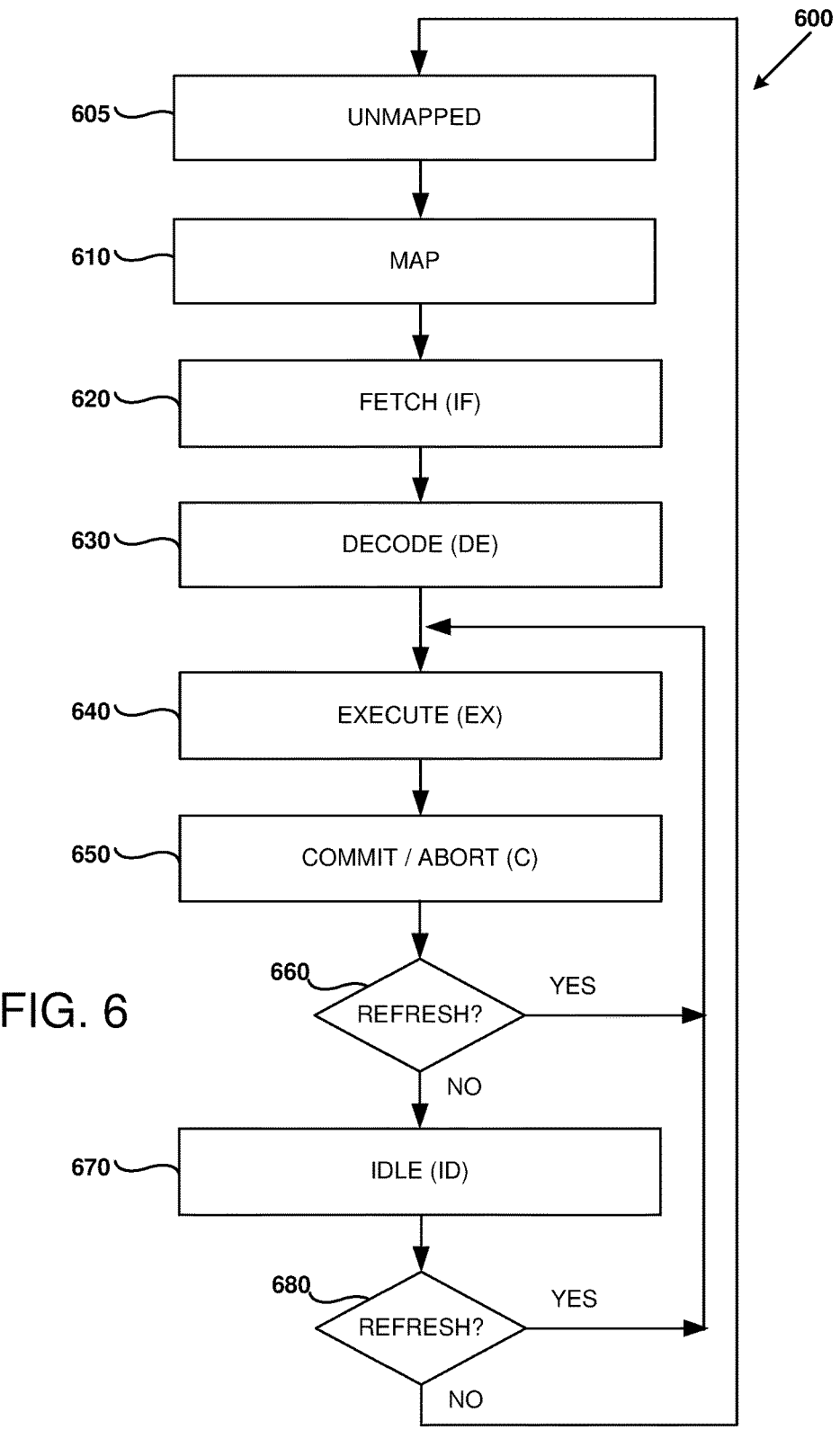
FIG. 6 illustrates examples of source and assembler code, as can be used in some examples of the disclosed technology.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction. For example, the decoded instructions can be stored in one of the instruction window stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. In some example embodiments, multiple instructions can be dispatched to respective functional units 260 concurrently with one another (in the same processor cycle). As discussed above, the functions performed can include arithmetical functions, logical functions, branch instructions, memory operations, and register operations. Further, depending on the operation to be performed, it may take multiple processor cycles using multiple functional units (or using multiple iterations of the same functional unit) to perform an intended operation. For example, the divide operation may take four processor cycles whereas an add or subtract operation may take two processor cycles. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block.

At the commit/abort state 650, the processor core control unit determines that operations performed by the instruction block can be completed. For example memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

Figure 7:
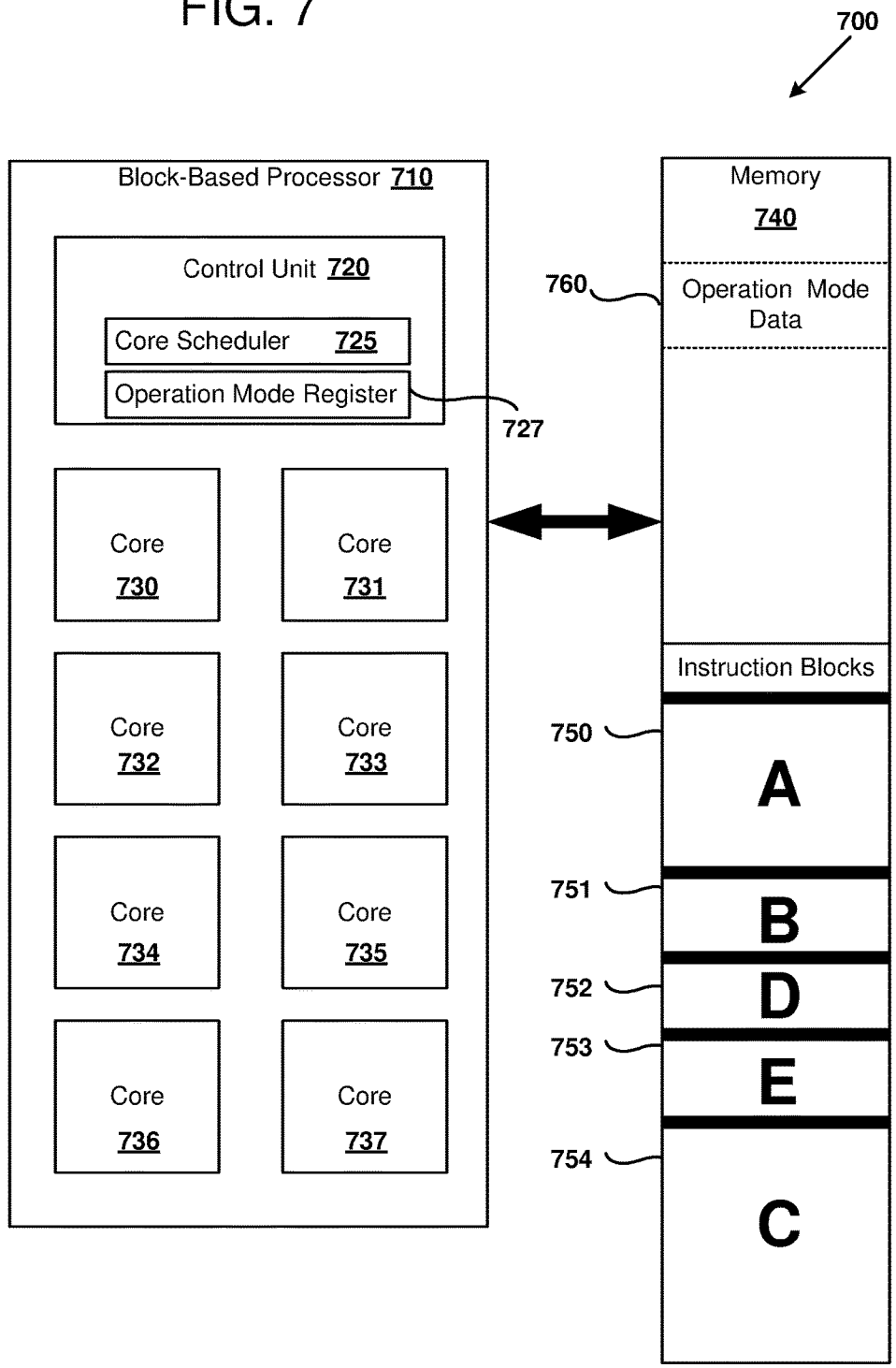
FIG. 7 illustrates a number of instructions blocks and processor cores, as can be used in some examples of the disclosed technology.

FIG. 7 is a diagram 700 illustrating an apparatus comprising a block-based processor 710 (e.g., block-based processor 100), including a control unit 720 configured to execute instruction blocks according to data for one or more operation modes. The control unit 720 includes a core scheduler 725 (e.g., scheduler 165) and an operation mode register 727. The core scheduler 725 schedules the flow of instructions including allocation and de-allocation of cores for performing instruction processing, control of input data and output data between any of the cores, register files, memory interfaces and/or I/O interfaces. The control unit 720 also includes an operation mode register 727, which can be used to store data indicating one or more execution flags for an instruction block.

The block-based processor 710 also includes one or more processer cores 730-737 (e.g., processor cores such as core 111) configured to fetch and execute instruction blocks and a control unit 720, when a branch signal indicating the target location is received from one of the instruction blocks. The illustrated block-based processor 710 has up to eight cores, but in other examples there could be 64, 512, 1024, or other numbers of block-based processor cores. The block-based processor 710 is coupled to a memory 740 (e.g., main memory 155) which includes a number of instruction blocks 750-755. In some examples of the disclosed technology, an operation mode data table 760 can be stored in memory, or built dynamically at run time, to indicate operation mode(s) for executing the instruction blocks 750-754, in lieu of, or in addition to, the operation mode register 727.

X. Example Method of Configuring Processor for Executing an Instruction Block

Figure 8:
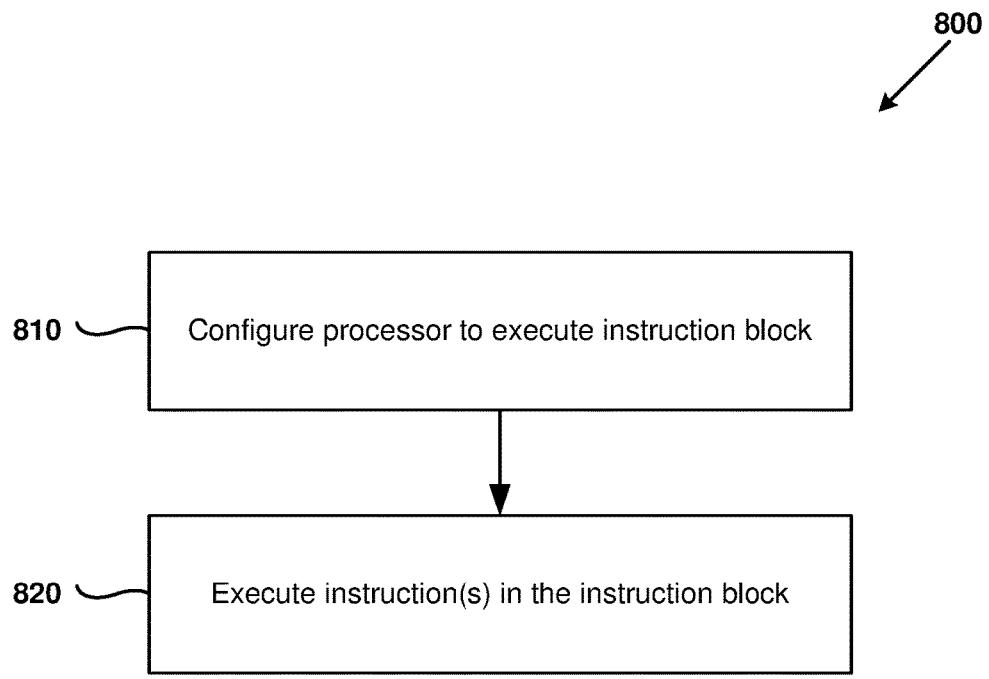
FIG. 8 is a flowchart illustrating an example method of executing instructions for an instruction block, as can be performed in certain examples of the disclosed technology.

FIG. 8 is a block diagram 800 outlining an example method of configuring a processor to operate according to instructions from an instruction block, as can be performed in certain examples of the disclosed technology. For example, the block-based processor 100 described above, can be configured to perform the method of FIG. 8.

At process block 810, the processor is configured to execute an instruction block. For example, an instruction block header can be decoded for a block-based processor instruction block that includes one or more fields defining semantics of the instruction block. The processor then configures at least one of its processor cores to execute instructions in the instruction block according to the header fields. The modes of operation that can be configured by the header include, but are not limited to: core fusion operation, vector mode operation, memory-dependence prediction operation, or in-order execution operation. In some examples, when at least one of the specified modes is a core fusion operation, the field corresponding to the specified mode can indicate a number of cores of the block-based processor to allocate to execute of the associated instruction block. In some examples, the core is configured to execute instructions according to two or more operation modes. For example, the core can be configured to perform core fusion operations and to enable or disable memory dependence prediction. Alternatively, for example, the processor can be configured for core fusion operation and in-order execution operations. In some examples, data indicating one or more of the specified operation modes can be stored in a location other than an instruction block header, for example by executing a particular instruction of an instruction block, by storing a value in a designated register or memory location, or other suitable means for providing data indicating the operation mode. Once the processor is configured to execute the instruction block, the method proceeds to process block 820.

At process block 820, the instructions in the instruction block are executed according to the operation mode selected at process block 810. For example, one or more of the processor cores depicted in FIG. 1, 2, or 7 can be configured to execute any of the instructions discussed herein according to the instruction header fields which can include, but are not limited to, core fusion operation, vector mode operation, memory-dependence prediction operation, and/or in-order execution operation.

XI. Example Method of Generating Block-Based Executable Instructions

Figure 9:
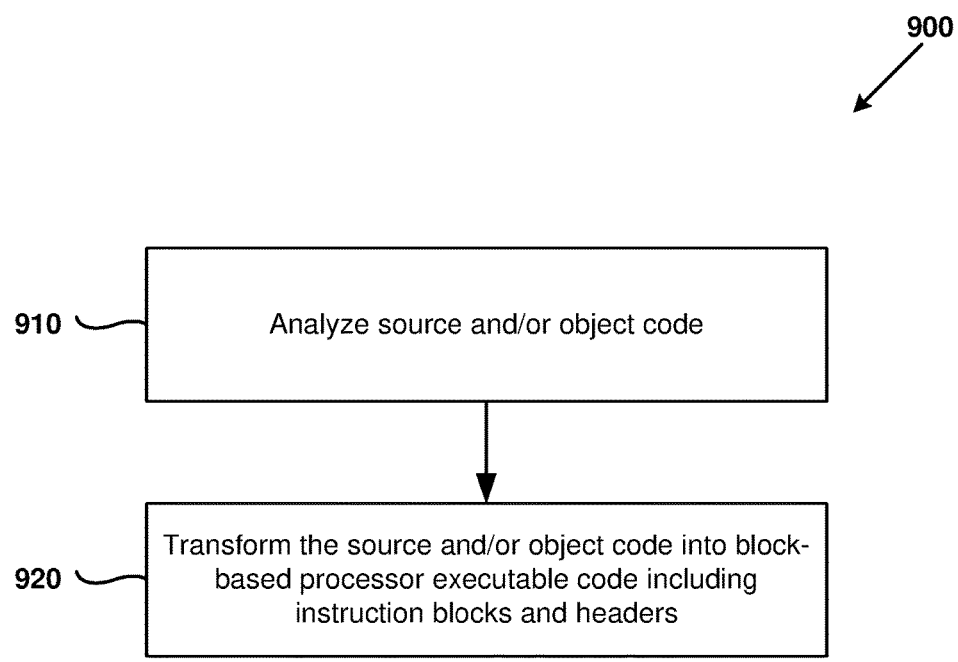
FIG. 9 is a flowchart outlining an example of transforming code into block-based processor executable code, as can be performed in certain examples of the disclosed technology.

FIG. 9 is a flowchart 900 outlining a method of compiling source and/or object code into executable code for a block-based processor, as can be performed in certain examples of the disclosed technology. For example, the method can be performed using a block-based processor, or a general-purpose processor that includes instructions for performing the disclosed method.

At process block 910, source code and/or object code for a block-based processor is analyzed with a compiler.

At process block 920, source code and/or object code is transformed into block-based processor executable code based on the analysis performed at process block 910. In some examples, the code is determined automatically by the compiler. In other examples, the code is determined, at least in part, by directives provided by the programmer of the instruction block code. For example, options within an integrated development environment, compiler pragmas, defined statements, and/or key words located in comments within source code can be used to, at least in part, indicate operation modes.

The executable code generated by transforming source and/or object code can be stored in a computer-readable storage medium. In other examples, the executable code is provided to a processor as part of an instruction stream (e.g., by sending executable instructions over a computer network, or by interpreting code written in an interpretive language locally).

XII. Example Hardware Architectures for Broadcast Channels

Embodiments of the disclosed technology provide the capability to broadcast one or more operand values for use by other instructions of an instruction window. In some implementations, for example, an instruction can perform an operation whose result is broadcast on a broadcast channel; that broadcast channel, in turn, can be made available for use by other instructions (e.g., all other instructions) in the instruction window. In this way, the result of an operation can be fanned out for use by other instructions.

In certain embodiments, a processor core of a block-based processor comprises hardware that allows for the sharing of a broadcast value generated from one instruction to other instructions (e.g., all other instructions) in an instruction window. In particular implementations, this hardware allows for the sharing of broadcast values to occur in a high-speed, power-efficient manner. The broadcast channel hardware can comprise, for example, a broadcast control bus that transmits broadcast control data (e.g., broadcast channel ID data and/or operand type data) and a broadcast data bus that transmits the value of the broadcast data itself. e.g. The broadcast control bus can be monitored by hardware (listening units) associated with each instruction in the instruction window. When broadcast control data is transmitted on the broadcast control bus that is recognized by a particular listening unit as being used by a particular instruction, the data on the broadcast data bus can be copied into a local buffer for that instruction. In other embodiments, the broadcast data can be stored in a dedicated store (or buffer) that temporarily stores the broadcast values separate from the buffers for the individual instructions and directly feeds the functional units when needed during instruction execution. The data stores or buffers used in embodiments described herein can be single-bit memory elements or multi-bit memory elements. The data stores or buffers can be formed, for example, from one or more flip-flops, latches, SRAM cells, DRAM cells, or other suitable memory elements.

This section discloses several example embodiments of such broadcast value hardware but should not be construed as limiting, as a wide variety of configurations can be employed to provide the desired broadcast functionality. For instance, a variety of different hardware architectures can allow a value generated upon execution of a particular instruction to be made available to multiple other instructions, all of which are considered to be within the scope of the disclosed technology.

The control signals used for directing and conveying data concerning the broadcast values can also vary from embodiment to embodiment. In particular embodiments disclosed herein, the instruction that generates the broadcast value includes identifiers that designate both which broadcast channel the broadcast value is to be broadcast on as well as what type of operand the broadcast value is to be used as. In other embodiments, the instructions that generate the broadcast value may only specify a broadcast channel but not an operand type, or an operand type but not a broadcast channel, or neither of a broadcast channel or operand type. The number of broadcast channels can vary and be, for example, any integer value of 1 or greater (1, 2, 3, etc.). The operand types can also vary and include any one or more types. In certain embodiments discussed herein, the following operand types are available: (a) a predicate operand (P); (b) a left operand (L); or (c) a right operand (R).

An example instruction for a block-based processor having a dataflow instruction set architecture and targeting a broadcast channel may be, for instance, "I[3] addi #1 B[1L]". This instruction will increment the value received as the instruction's operand (e.g., the right operand by default or the left operand by default) by 1 and then send the result of the incrementing on broadcast channel 1 and designate the result for use as a left operand (where the channel is shown as "1" and the operand type is shown as "L" for the target "B[1L]"). A second example instruction targeting another broadcast channel may be, for instance, "I[4] subi #1B[2R]", which will decrement the value received as the instruction's operand (e.g., the right operand by default or the left operand by default) by 1 and then send the result of the decrementing on broadcast channel 2 and designate the result for use as a right operand.

Another instruction in the instruction window may then use either of these broadcast values in accordance with its designated operand type. As shown by instructions 520, 530, and 540 in FIG. 5, for example, the instruction format can include a broadcast identifier field (BID), which indicates which broadcast channel to use for an operand for the instruction (e.g., for a right operand by default or for a left operand by default). An example instruction using a broadcast value may be, for instance, "I[5] divi #2 B1 T[6R]", which will divide the value from the first broadcast channel ("B1") by 2, and then send the result to instruction 6 as its right operand.

An example table showing the broadcast identifiers for an example architecture having three broadcast channels is shown below:

TABLE 1

| Broadcast Identifiers (BIDs) | |
| --- | --- |
| ID | Channel |
| 0 | No broadcast used |
| 1 | Channel 1 |
| 2 | Channel 2 |
| 3 | Channel 3 |

In particular example implementations, one or more (e.g., all) of the following behavioral principles are adhered by the processor core: (1) a broadcast identifier field in each instruction format encodes the broadcast channel to receive an operand on (e.g., a two-bit field (as in Table 1), a three-bit field, or n-bit field where n>1); (2) the sender encodes the operand type (e.g., left, right, or predicate); (3) instructions may only have one target send to a broadcast channel; or (4) instructions that receive an operand on a broadcast channel cannot receive the same operand as input. These principles may vary from implementation to implementation. For instance, some embodiments can allow for multiple broadcast channels to be targeted by a single instruction, or an instruction can include two or more broadcast identifier fields that allow multiple ones of its operands to come from broadcast channels (e.g., an instruction may include three broadcast identifier fields, thus allowing a broadcast value to be used for each of the instruction's predicate, left operand, or right operand).

Figure 10:
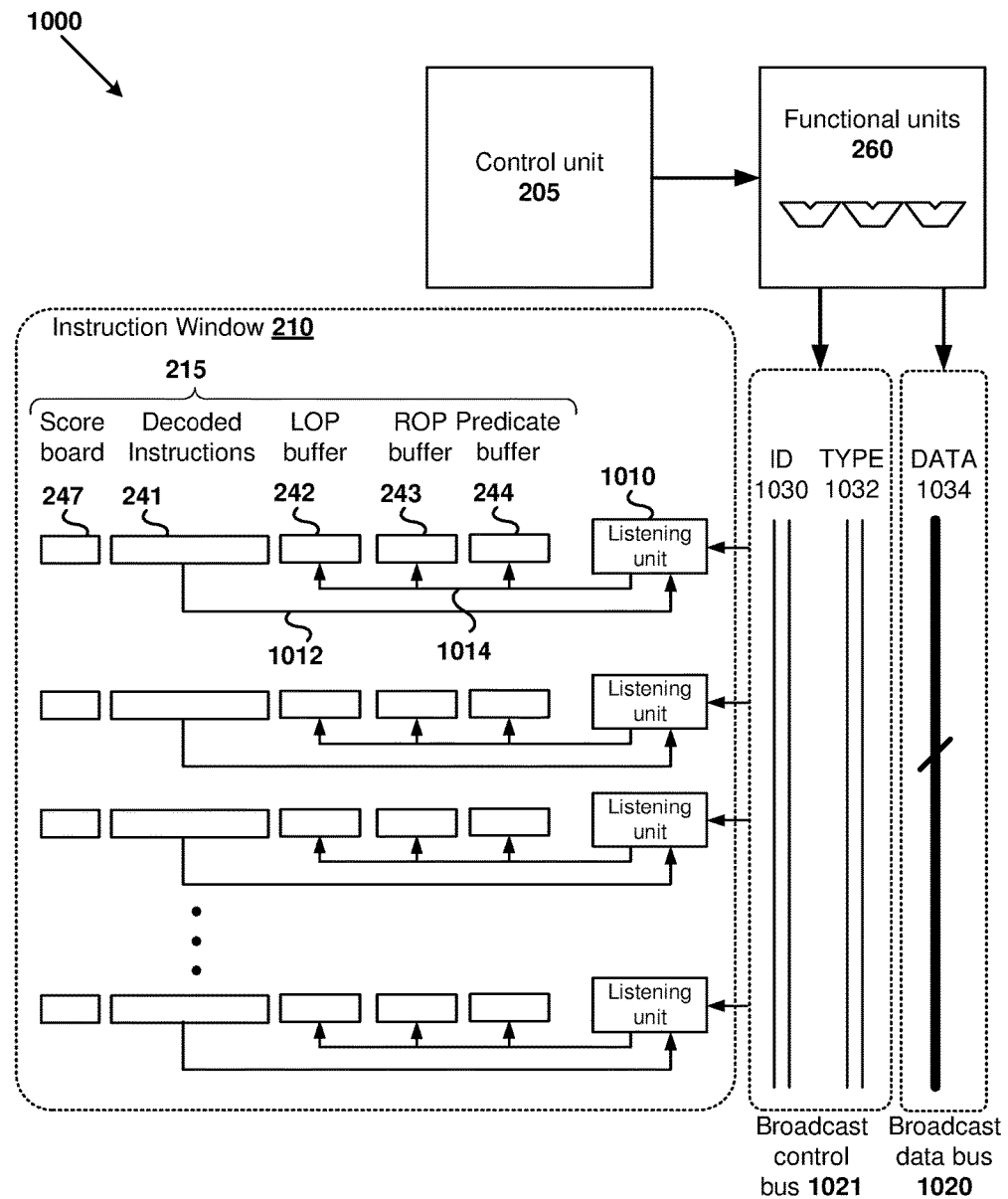
FIG. 10 is a block diagram illustrating a first example hardware architecture for providing one or more broadcast values to be present in a processor core of a processor-block processor.

FIG. 10 is a block diagram illustrating a first example hardware architecture for providing one or more broadcast values to be present in a processor core of a processor-block processor. In particular, FIG. 10 shows a block diagram of an architecture that uses one or more data buses to broadcast the broadcast values to listening hardware (referred to as "listening units") associated with instructions (e.g., each available instruction) in the instruction window. FIG. 10 also shows one or more control buses for broadcasting associated broadcast control data for each data bus. In certain implementations, the listening unit for a respective instruction is responsible for determining when the instruction uses a broadcast value and thus when the listening unit should be listening for a broadcast value having a designated broadcast channel, monitoring the one or more broadcast control buses when the instruction uses a broadcast value, detecting that the relevant broadcast value is being broadcast on a respective broadcast data bus, and copying operand data from the broadcast data bus into the instruction's appropriate buffer when the relevant broadcast is detected (e.g., the left operand buffer, right operand buffer, or predicate buffer, depending on the operand type specified in the broadcast data).

More specifically, FIG. 10 shows the instruction window store 215 of the processor block along with the associated memory units (buffers) used when executing instructions in the instruction window 210. For individual instructions in the instruction window, FIG. 10 shows decoded instructions buffer 241, a left operand (LOP) buffer 242, a right operand (ROP) buffer 243, a predicate buffer 244, and an instruction scoreboard buffer 247.

Also shown in FIG. 10 is an example broadcast data bus 1020 and its associated broadcast control bus 1021. Although only one broadcast data bus and one broadcast control bus is illustrated in FIG. 10, multiple broadcast data and control buses could be present and monitored by individual listening units. It should also be understood that a given processor core may include multiple instruction windows. In such cases, each instruction window can have one or more dedicated broadcast data buses and associated broadcast control busses. In other words, each instruction window of a processor core can have its own set of one or more broadcast buses.

In FIG. 10, the broadcast control bus 1021 is multi-bit and includes broadcast identification lines 1030 (e.g., a 2-bit-wide bus portion) and operand type identification lines 1032 (e.g., a 2-bit-wide bus portion for identifying between a left operand (LOP), right operand (ROP), and predicate operand (P)). The broadcast data bus 1020 includes operand data lines 1034 (e.g., a 32-bit wide bus portion (or any n-bit wide bus portion where n is greater than 1)) that carry the operand data to be used by an instruction.

The broadcast data bus 1020 and the broadcast control bus 1021 can receive, as input, data from the one or more functional units 260 as controlled by the control unit 205. For instance, if a particular instruction of the instruction window targets a broadcast channel, then the control unit can schedule and control execution of that instruction such that the result of the instruction is then transmitted on the broadcast data bus 1020 (e.g., for one processor clock cycle) along with the appropriate broadcast channel identification and operand type identification data on the broadcast control bus 1021. In cases where multiple instructions target broadcast channels, the control unit 205 may need to schedule execution of those instructions such that conflicts on the broadcast data bus 1020 are prevented. In some examples, for instance, broadcasts are made on a processor-cycle-by-processor-cycle basis, so certain instructions whose results are targeted for a broadcast channel already in use during a given processor cycle may need to be scheduled for later processor cycles. Such scheduling will ordinarily depend at least in part on the number of broadcast channels available.

FIG. 10 also illustrates example listening units (a representative one of which is shown as listening unit 1010) for each instruction of the instruction window store 215 for the illustrated instruction window 210. The example listening unit 1010 comprises logic configured to determine when the listening unit 1010 should be listening for a broadcast value and on which broadcast channel. For example, the listening unit 1010 can receive the bit values of the broadcast identifier from the BID field of the decoded instruction 241 via broadcast identifier connection 1012. The listening unit 1010 can then decode the bits from the BID field and determine whether the listening unit should be monitoring the broadcast control bus 1021 (e.g., by determining whether the values of the BID field are 1, 2, or 3 in accordance with Table 1). If no broadcast channel is specified in the BID field, then the listening unit 1010 can conserve power by not performing any active tasks. If the BID field of the instruction associated with the listening unit 1010 indicates that a broadcast channel is to be used for an operand for the instruction, then the listening unit 1010 can monitor the broadcast control bus 1021 and, as a new broadcast becomes available, decode at least a portion of the broadcast control data to determine if the broadcast corresponds to the broadcast data the listening unit is waiting for. For example, the broadcast data bus 1020 and broadcast control bus 1021 can transmit broadcast data and broadcast control data once per processor cycle, and for any given processor cycle, may broadcast data for one of multiple available broadcast channels. For broadcast data being currently broadcast, the ID bits 1030 of the broadcast control data can be used to identify the broadcast channel that the data corresponds to; the operand type bits 1032 can be used to identify the type of operand data being sent; and the operand data 1034 can be used to transmit the main body (data) of the operand itself.

The listening unit 1010 can include decoding logic for decoding the bits from the ID bits 1030 and the operand type bits 1032, as well as connections and logic for copying the data from the operand data bits 1034 when the broadcast channel from the ID bits 1030 match the broadcast channel of the BID field into the appropriate buffer via connections 1014 based on the operand type bits 1032. For example, if the operand type field 1032 indicates that the operand data of the expected broadcast channel is to be used as a left operand, then the connection 1014 can route the data for storage in the LOP buffer 242 of the corresponding instruction.

Figure 11:
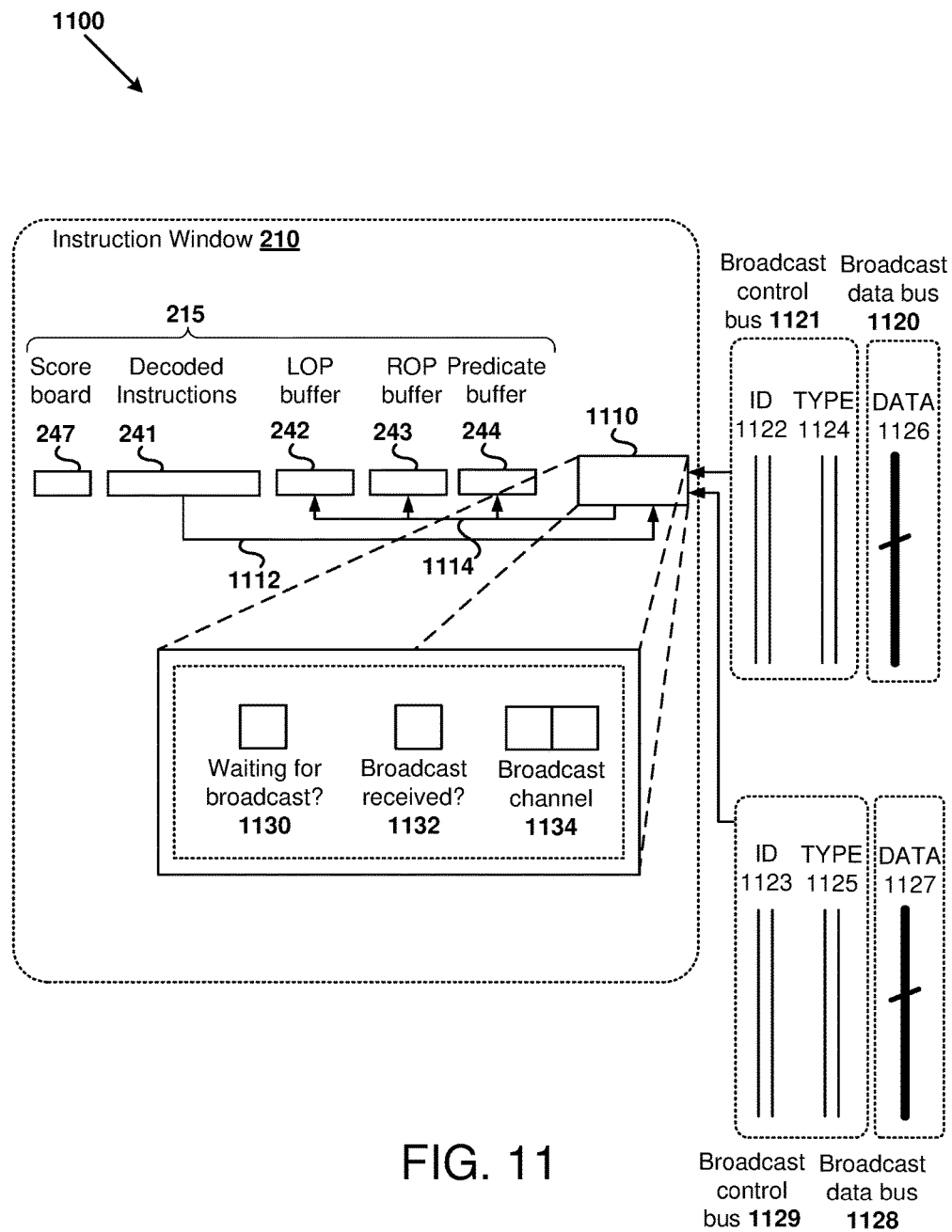
FIG. 11 is a block diagram illustrating an expanded view of an example embodiment of a listening unit as can be used in the embodiment of FIG. 10.

FIG. 11 is a block diagram 1100 illustrating an expanded view of an example embodiment of a listening unit 1110. The example listening unit 1110 may be any of the listening units illustrated in FIG. 10. In the illustrated embodiment, the listening unit 1110 includes memory elements or buffers (e.g., flip-flops, latches, SRAM cells, DRAM cells, or other memory elements) that are used to temporarily store control bits that serve to control operation of the listening unit 1110. A first memory element 1130 stores a flag (e.g., a 1-bit value) for indicating whether or not the listening unit 1110 is active in accordance with its corresponding instruction. For example, if the BID field of the corresponding instruction indicates that the instruction is to use a broadcast value as an operand, the first memory element 1130 can store a value indicating that the listening unit is active and waiting for a broadcast. Second memory element 1132 stores a flag (e.g., a 1-bit value) for indicating whether or not the listening unit 1110 has received the expected broadcast. For instance, the bit can be set low (0) when the listening unit 1110 is still waiting for the expected broadcast value to arrive, and high (1) when the listening unit 1110 has detected and copied the broadcast value to the relevant buffer for the instruction, or vice versa. The control unit 205 (shown in FIG. 2 and FIG. 10) can use the value of the second memory element to determine when the instruction associated with the listening unit 1110 is ready for execution. A third memory element 1134 stores a value (e.g., a 2-bit value or n-bit value) for indicating what broadcast channel to wait for and, when the selected broadcast channel is broadcasting, to copy the operand data from. In the illustrated embodiment, the third memory element 1134 is a two-bit register for storing one of the broadcast channels of Table 1 above.

FIG. 11 also illustrates an embodiment in which multiple broadcast data buses 1120, 1128 and multiple broadcast control buses 1121, 1129 are present and monitored by the listening unit 1110. The broadcast control bus 1121 includes broadcast identification bits 1122 and operand type bits 1124, while the broadcast data bus 1120 includes operand data bits 1126, as described above. Similarly, broadcast control bus 1129 includes broadcast identification bits 1123 and operand type bits 1125, while the broadcast data bus 1120 includes operand data bits 1127 as described above.

In other embodiments, the operand type data (broadcast as operand type bits 1124, 1125 in FIG. 11) is not transmitted as part of any broadcast bus, but is instead embedded in the instruction itself. For example, the operand type can be specified in an additional field in the decoded instruction 241. In such instances, then, it can be said that the receiver of the broadcast data (the instruction) controls the operand type instead of the transmitter of the broadcast value.

As with FIG. 10, it should also be understood that a given processor core may include multiple instruction windows. In such cases, each instruction window can have one or more dedicated broadcast data buses and associated broadcast control busses. In other words, each instruction window of a processor core can have its own set of one or more broadcast buses.

In embodiments of the disclosed technology, multiple listening units can be present, each being associated with a different instruction and/or a different broadcast data and control bus. FIG. 10, for example, illustrates the presence of such multiple listening units. In this way, broadcast channels can be effectively used in a highly flexible manner to broadcast operand values to one or more instructions of the instruction window in a manner that is not limited by the number of target fields in the underlying instruction format for the processor. Thus, the broadcast channels provide a mechanism to provide wide fanout of operand values, when needed, or provide relatively narrow fanout of operand values, when appropriate. The underlying hardware supporting the broadcast channels also creates significant flexibility that can be adapted for a variety of usage scenarios. Still further, by using listening units that are selectively active based in part on data contained within its associated instruction (e.g., the BID field), the overall power used by such an architecture can be reduced. Still further, by using a broadcast data bus 1020 that is capable of transmitting data for multiple broadcast channels (as opposed to individual data busses dedicated to each broadcast channel), the hardware overhead (the area of hardware) used for implementing the broadcast network can be reduced. It should be understood, however, that in other embodiments, each broadcast channel has its own dedicated broadcast data bus, and such embodiments are considered to be within the scope of the disclosed technology.

Figure 12:
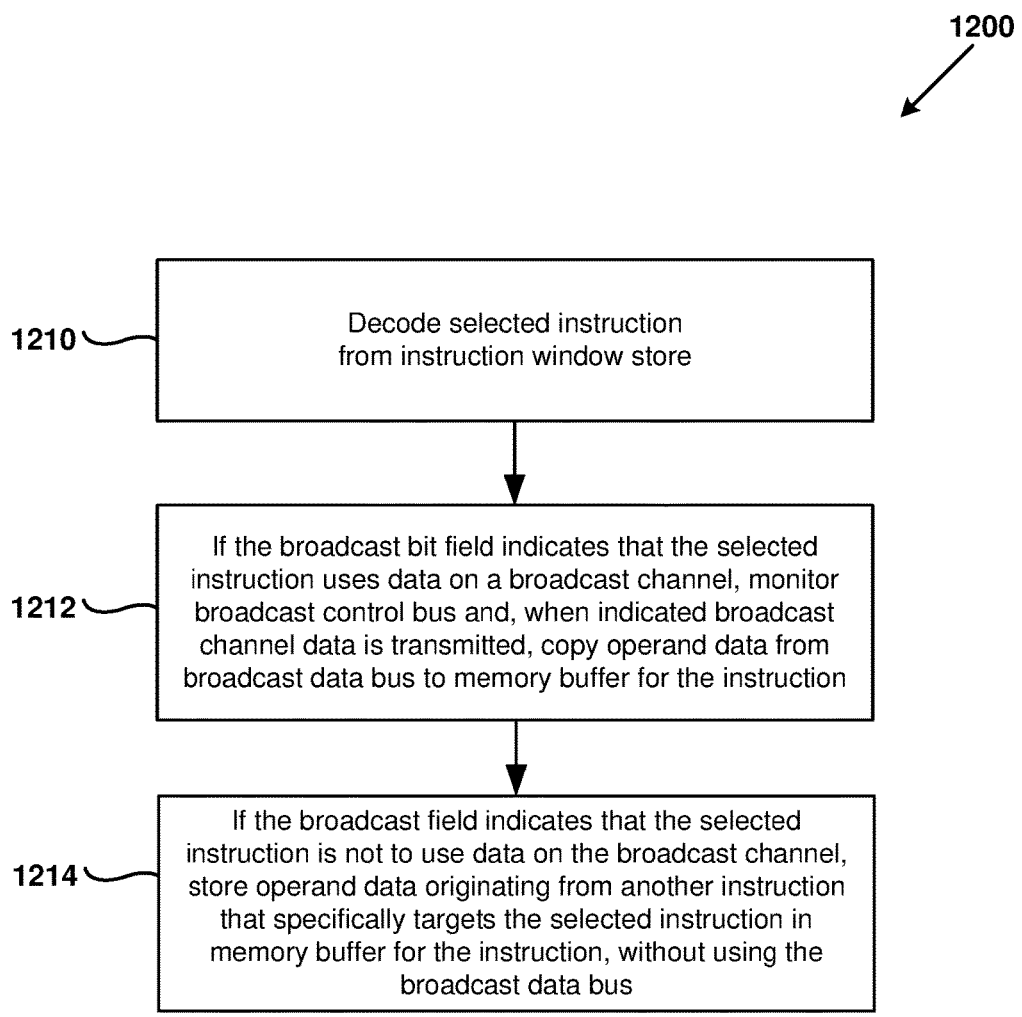
FIG. 12 is a flow chart illustrating an example method performed during operation of an example embodiment of a processor core of a block-based processor, such as by a listening unit for detecting and using broadcast data broadcast on a data bus as in FIGS. 10 and 11.

FIG. 12 is a flow chart 1200 illustrating an example method performed during operation of an example embodiment of a processor core of a block-based processor (e.g., by a listening unit for detecting and using broadcast data broadcast on a data bus as in FIGS. 10 and 11). At 1210, a selected instruction from an instruction window store storing a block of instructions is decoded (e.g., an instruction for which a listening unit is assigned or configured). In the illustrated embodiment, the decoding includes decoding a broadcast identification field indicating whether or not the selected instruction uses data on a broadcast channel as an operand (e.g., decoding the BID field of the instruction). At 1212, when the broadcast identification field indicates that the selected instruction is to use data on a broadcast channel, broadcast control data on a broadcast control bus is monitored and, when the broadcast control data on the broadcast control bus indicates that the currently transmitted values are for the broadcast channel, operand data from the broadcast data bus is copied to a buffer associated with the selected instruction (e.g., a left operand, right operand, or predicate operand buffer, as guided by operand type data (which can be broadcast on the broadcast control bus or embedded in the instruction being executed)). At 1214, when the broadcast field indicates that the selected instruction is not to use data on the broadcast channel, operand data in the buffer associated with the selected instruction is stored without using data from the broadcast data bus; instead, the operand data for the buffer originates from execution of another instruction that specifically targets the selected instruction, thus avoiding the use of the broadcast data bus.

In particular example implementations of this embodiment of the disclosed technology, a processor core in a block-based processor (e.g., having multiple processor cores) comprises one or more functional units configured to perform functions using one or more operands; an instruction window comprising buffers configured to store individual instructions for execution by the processor core; and a control unit configured to execute the instructions in the instruction window and control operation of the one or more functional units. In such embodiments, the instruction window can include, for a respective instruction to be executed by the processor core, (a) a buffer dedicated to storing the respective instruction; (b) a buffer dedicated to storing one or more operands for use by the respective instruction; and (c) a listening unit configured to monitor a broadcast control bus and/or broadcast data bus shared among instructions in the instruction window and, when instructed by data from or a control signal generated from the respective instruction, detect values broadcast on the broadcast data bus and conditionally copy the values into the buffer dedicated to storing the operand. In some implementations, the buffer is dedicated to storing a left operand or a right operand, and the listening unit is configured to copy the one or more values into the buffer when operand type data from the values broadcast on the broadcast control bus indicate that the values being broadcast are to be used as a left operand or a right operand. In certain implementations, the buffer is dedicated to storing a left operand or a right operand, and the instruction window further includes, for the respective instruction to be executed by the processor core, (d) a buffer dedicated to storing a predicate operand for use by the respective instruction. In such implementations, the listening unit is further configured to conditionally copy one or more of the values from the broadcast data bus into the buffer dedicated to storing the predicate operand when operand type data from the values broadcast on the broadcast control bus indicate that the values being broadcast are to be used as a predicate operand. In further implementations, the operand type data is not broadcast on the broadcast control bus but is instead embedded in the instruction itself (e.g., as a field in the instruction). In some implementations, the values broadcast on the broadcast control bus include one or more broadcast channel identifiers that identify which one of multiple available broadcast channels the values being currently broadcast on the broadcast data bus are associated with. For example, the listening unit can be configured to copy the one or more values into the buffer dedicated to storing the operand when the broadcast channel identified by the broadcast channel identifiers matches a broadcast channel specified by the respective instruction. In some implementations, the listening unit includes a set of control memory elements, a first memory element of the set storing a bit value indicating whether the listening unit is waiting for a broadcast on the broadcast control bus and/or broadcast data bus and a second memory element of the set storing a bit value indicating whether the listening unit has detected and copied data from the broadcast data bus. In some cases, the set of control memory elements further includes a third memory element comprising one or more bit values that identify a broadcast channel for which the listening unit is waiting. In some examples, the respective instruction includes broadcast ID data identifying a broadcast channel for which the listening unit is to monitor and operand type data indicating an operand type of the data broadcast on the broadcast data bus. In some implementations, the values on the broadcast data bus are variable on a processor-cycle-by-processor-cycle basis.

Figure 13:
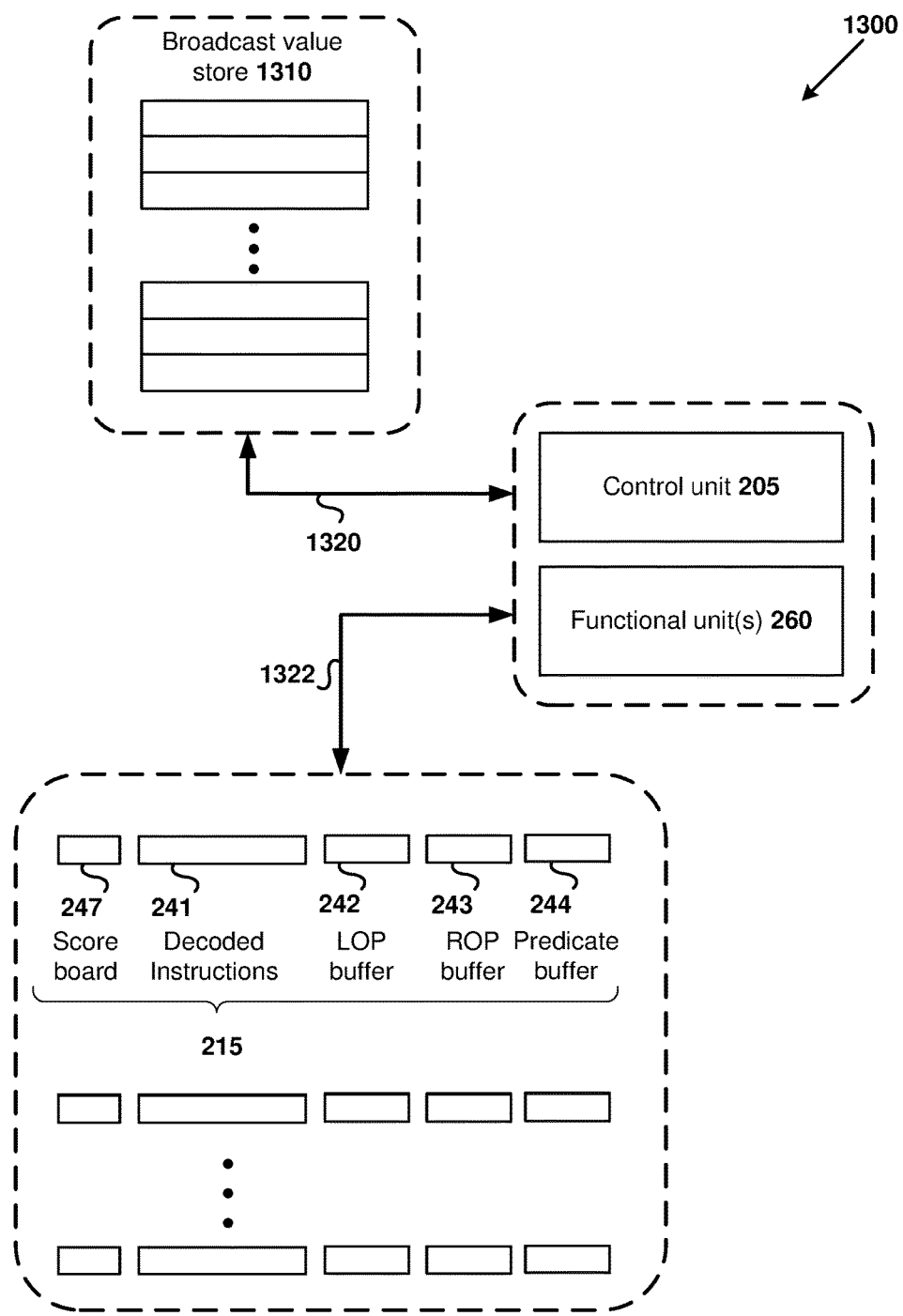
FIG. 13 is a block diagram illustrating a second example hardware architecture for providing one or more broadcast values to be present in a processor core of a processor-block processor.

FIG. 13 is a block diagram illustrating a second example hardware architecture for providing one or more broadcast values to be present in a processor core of a processor-block processor. In particular, FIG. 13 is a block diagram of an architecture 1300 that uses a broadcast value store 1310 separate from the buffers 247, 241, 242, 243, 244 of the instruction window store 215 to store the broadcast values. The broadcast value store 1310 can comprise a plurality of buffers that temporarily store broadcast values (e.g., operand data for a broadcast value and, in some cases, an indication of what type of operand the operand data is to be used for (such as, a left operand, right operand, or predicate operand)). In particular implementations, the broadcast value store 1310 is transparent to the compiler for the processor core and does not form an architectural register (e.g., the broadcast value store is not part of the general register file (such as global register file 143) that can be written to via a write instruction and is not part of the main memory 155 that can be stored to via a store instruction). Instead, the broadcast value store 1310 operates in the background to provide a high-speed, direct retrieval mechanism for broadcast values. In operation, and in the illustrated embodiment, control unit 205 of the processor core is configured to directly access the values of the broadcast value store 1310 and provide the values directly to one or more of the functional units 260 when appropriate (e.g., via a network 1320). Thus, an instruction of the instruction window store 215 can be executed using a broadcast value without having to copy the broadcast value into a buffer of the instruction window store as in FIGS. 10-11. The architecture of FIG. 13 can therefore consume less power and/or use less area overhead because it does not use separate listening units for each instruction of the instruction window. In FIG. 13, network 1322 provides the values from the buffers of the instruction window 215 to the functional units 260.

Figure 14:
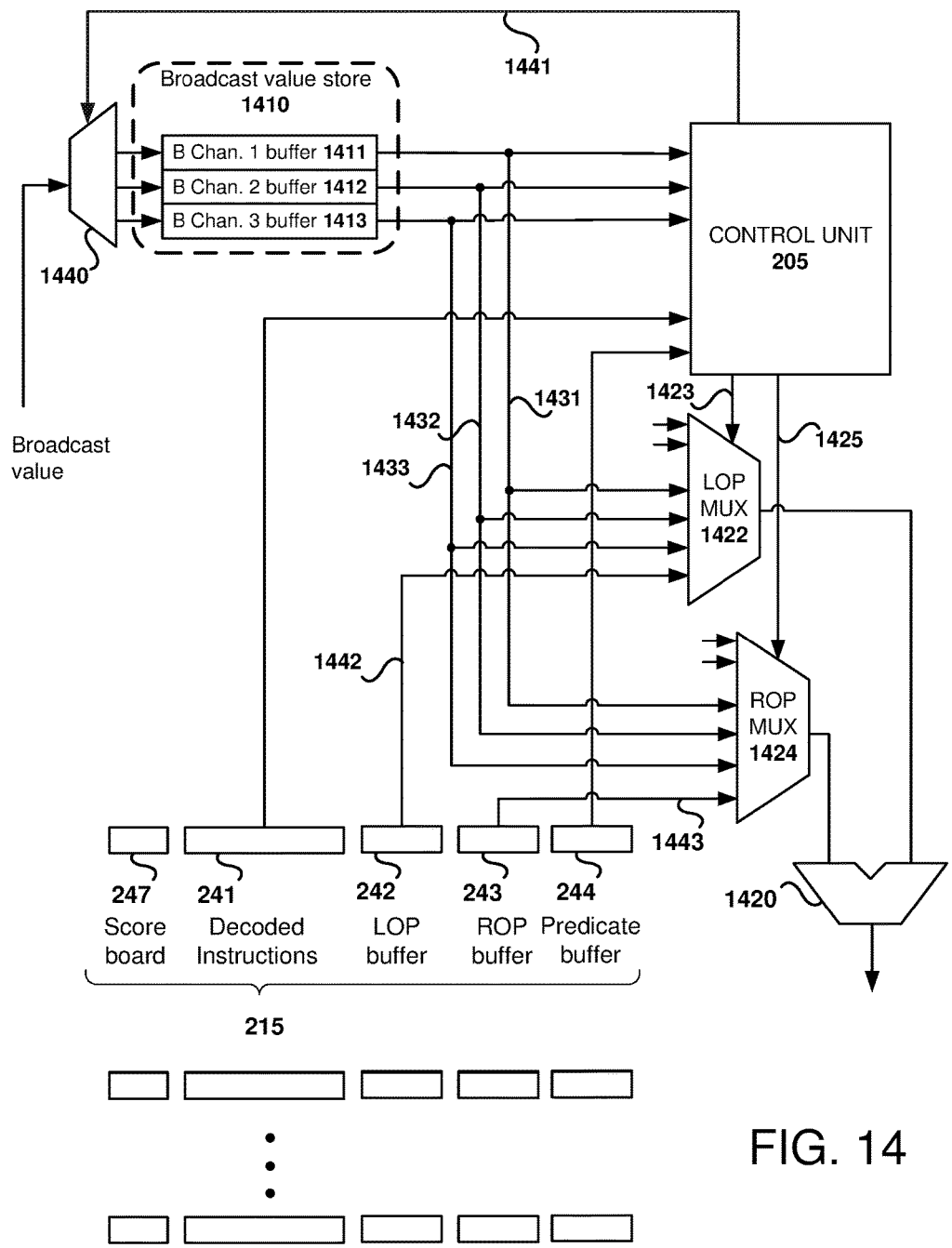
FIG. 14 is a block diagram illustrating an example implementation of the embodiment illustrated in FIG. 13.

FIG. 14 is a block diagram illustrating in more detail an example implementation of the embodiment illustrated in FIG. 13. In FIG. 14, a broadcast value store 1410 is illustrated comprising individual buffers dedicated to individual broadcast channels for the instruction window 215. The buffers can comprise, for example, flip-flops, latches, DRAM cells, SRAM cells, or other memory elements. In particular, the illustrated broadcast value store 1410 comprises buffer 1411 for broadcast channel 1, buffer 1412 for broadcast channel 2, and buffer 1413 for broadcast channel 3. Each of the buffers 1411, 1412, 1413 is configured to provide an operand value to a functional unit (a representative one of which is shown as functional unit 1420) of the available functional units as either a left operand or right operand. In particular, networks 1431, 1432, 1433 connect the respective buffers 1411, 1412, 1413 to left operand multiplexer 1422 and right operand multiplexer 1424, which provide respective left and right inputs to the representative functional unit 1420. (Although only a single functional unit 1420 is shown in FIG. 14, it is to be understood that multiple functional units will typically be present, as in FIG. 2, each of which can be individually accessed and controlled by control unit 205.) In the illustrated embodiment, each of the buffers 1411, 1412, 1413 is also configured to provide an operand value as a predicate operand. In such instances, the predicate operand value (when present) can be output to the control unit 205, which can then store the predicate, and upon evaluation of any instruction in the instruction window predicated on that predicate, determine whether to execute the instruction.

The illustrated left operand multiplexer 1422 and right operand multiplexer 1424 are further configured to input left and right operand values from the respective LOP buffer 242 and ROP buffer 243 via connections 1442, 1443 under control of the control unit 205 and when appropriate (e.g., when the BID field indicates that a broadcast value is not used or when a broadcast value is used for only one operand.). (Although the multiplexers 1422, 1424 are shown as inputting values only from LOP buffer 242 and ROP buffer 243, it should be understood that the multiplexers 1422, 1424 will also typically input left and right operand values from the other LOP buffers and ROP buffers of the instructions in the instruction window.) Further, in particular embodiments, the illustrated multiplexers 1422, 1424 are configured to input additional values beyond the left and right operand values from the instruction window and the broadcast value store 1410. For instance, the multiplexers 1422, 1424 can also be configured to input any one or more of: bypass values, operand values from a forwarding bus, operand values from other cores, operand values stored in the general register file (such as global register file 143), or operand values stored in the main memory (such as main memory 155).

In certain embodiments, the broadcast value store 1410 is configured to temporarily store and provide broadcast values for a single processor core. In other embodiments, however, the broadcast value store 1410 can include buffers that are used by one or more additional processor cores. Still further, the buffers of the broadcast value store 1410 can, in some embodiments, be shared among multiple processor cores of the block-based processor. That is, in certain embodiments, an individual buffer of the broadcast value store 1410 can be accessed by multiple processor cores of the processor.

Additionally, in some embodiments, the broadcast value store 1410 can include additional sets of buffers for each instruction window in a core. As noted above, and illustrated in FIG. 2, a processor core can have two or more instruction windows so that two or more respective instruction blocks can be "in flight" simultaneously (executing but not yet committed). In particular embodiments, the number of buffers in the broadcast value store 1410 will be the number of available channels multiplied by the number of instruction windows in the core (or the number of instruction blocks that can be "in flight" simultaneously). For example, if a given processor architecture supports three broadcast channels and four instruction windows, then the broadcast value stores 1410 would have 12 buffers (3 channel-specific buffers for each instruction window). Further, the networking hardware for implementing such embodiments can be similar to that shown in FIG. 14 for each respective instruction window.

In the illustrated embodiment, the control unit 205 operates control lines 1423, 1425 of the multiplexers 1422, 1424. Thus, when executing a selected instruction from the instruction window, the control unit 205 can decode the instruction and implement the desired operation using the appropriate input operand values and using the appropriate one or more functions of the functional units (such as functional unit 1420).

In the illustrated embodiment, the control unit 205 is also configured to route and store a broadcast value into its proper buffer of the broadcast value store 1410. For instance, when an instruction that is being executed targets a broadcast channel, the value generated by the instruction (potentially resulting from an operation performed by a functional unit) can be routed to the corresponding one of the buffers 1411, 1412, 1413 via a multiplexer 1440 having a control line 1441 controlled by the control unit 205.

In further embodiments, and like the embodiments shown in FIGS. 10-11 and discussed above, the operand type data is not stored as part of the data in the buffers of the broadcast value store 1310, 1410 but is instead embedded in the instruction itself. For example, the operand type can be specified in an additional field in the decoded instruction 241.

Figure 15:
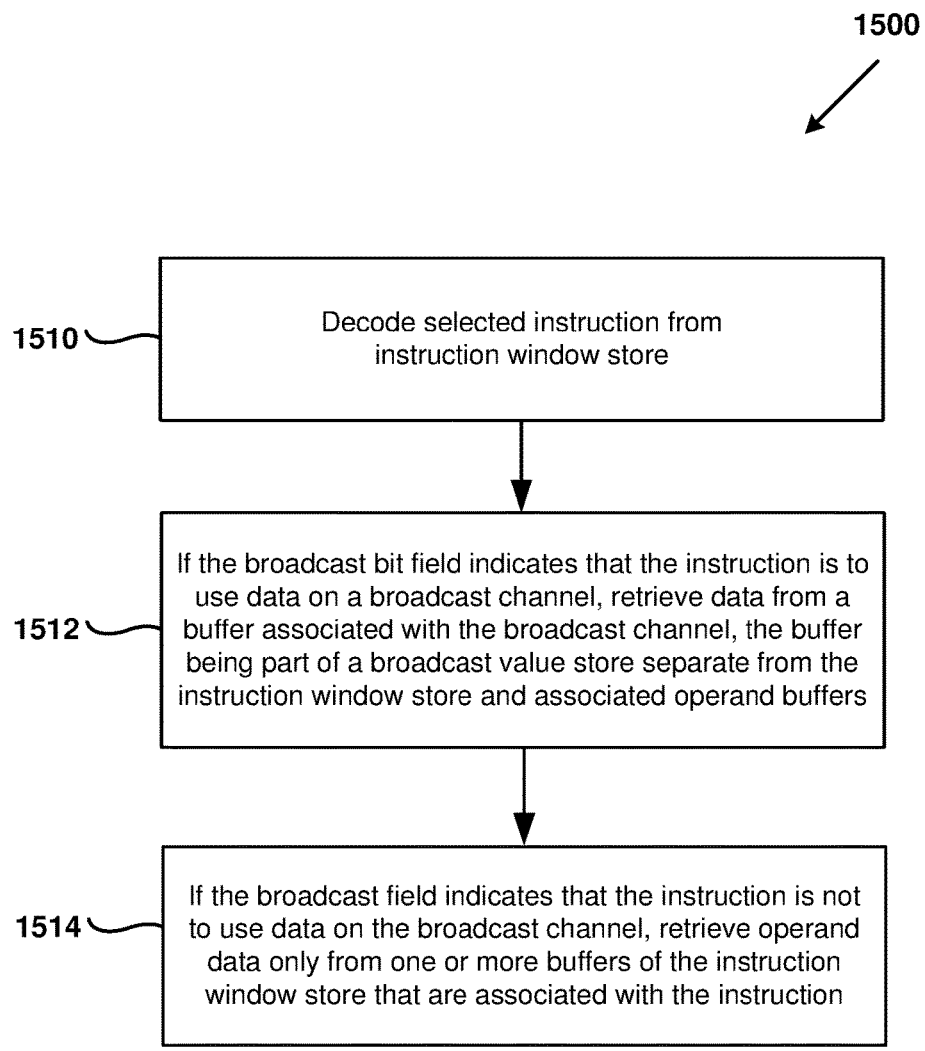
FIG. 15 is a flow chart illustrating an example method performed during operation of an example embodiment of a processor core of a block-based processor, such as by a processor core as in FIGS. 13 and 14 that uses a dedicated broadcast value store for storing broadcast values and that directly access such broadcast values during instruction execution without copying and accessing the memory buffers of an instruction window.

FIG. 15 is a flow chart 1500 illustrating an example method performed during operation of an example embodiment of a processor core of a block-based processor (e.g., by a processor core as in FIGS. 13 and 14 that uses a dedicated broadcast value store for storing broadcast values and that directly access such broadcast values during instruction execution without copying the value into and accessing the value from the buffers of an instruction window). At 1510, an instruction is decoded from an instruction window store storing a block of instructions. The decoding can include decoding a broadcast identification field indicating whether or not the instruction uses data on a broadcast channel as one or more operands. The instruction window store can include buffers for each individual instruction as well buffers for the operands associated with each instruction. At 1512, when the broadcast identification field indicates that the instruction is to use data on a broadcast channel, data is retrieved from a buffer associated with the broadcast channel, the buffer being part of a broadcast value store separate from the instruction window store storing the block of instructions and associated operand buffers. At 1514, when the broadcast field indicates that the instruction is not to use data on the broadcast channel, operand data is retrieved only from one or more of the operand buffers of the instruction window store that are associated with the instruction.

In particular implementations, when the broadcast identification field indicates that the instruction is to use the data on the broadcast channel, operand type data associated with the data on the broadcast channel is also retrieved from the associated buffer of the broadcast value store and operand data is applied during execution of the instruction in accordance with the operand type data received. Further, the broadcast value store can include buffers that are dedicated to respective broadcast channels for the processor core. Still further, the instruction window store can be one of a plurality of instruction window stores, each storing a different block of instructions; in such embodiments, each buffer of the broadcast value store can be dedicated to a respective broadcast channel for a respective instruction window store of the processor core.

In particular implementations of this embodiment, a processor core in a block-based processor having multiple processor cores comprises: one or more functional units configured to perform functions for one or more instructions; an instruction window comprising buffers configured to store individual instructions for execution by the processor core, the instruction window further comprising one or more operand buffers for individual instructions configured to store operand values; and a control unit configured to execute the instructions in the instruction window and control operation of the one or more functional units. The block-based processor further comprises a broadcast value store comprising a plurality of buffers dedicated to storing broadcast values, each buffer of the broadcast value store being associated with a respective broadcast channel from among a plurality of available broadcast channels. In some implementations, the instruction window is one of a plurality of instruction windows in the respective one of the processor cores, and each buffer of the broadcast store is associated with both a respective broadcast channel from among the plurality of available broadcast channels and an associated one of the plurality of instruction windows. In certain implementations, during execution of an instruction, the control unit is configured to selectively fetch and send to the one or more functional units either an operand value from one of the operand buffers in the instruction window for the instruction, or an operand value from one of the buffers of the broadcast value store, the selective use being dependent on whether the instruction specifies use of one of the broadcast channels for an operand for the instruction. In particular implementations, the buffers for the individual instruction further include a predicate operand buffer configured to store a predicate operand value, and the control unit is configured to selectively use as a predicate for the individual instruction either a predicate value from the predicate operand buffer or a predicate value from one of the buffers of the broadcast value store, the selective use being dependent on whether the individual instruction specifies use of one of the broadcast channels for an operand for the individual instruction and also whether an operand type value at the specified one of the broadcast channels indicates that the channel is for a predicate operand. In some implementations, at least some of the broadcast values stored in the broadcast value store are available for operand use to all instructions in the instruction window. In particular implementations, the broadcast values stored in a buffer of the broadcast value store include operand type values indicative of an operand type for the data in the buffer of the broadcast value memory. For example, the multiple operand types include two or more of: (a) a predicate operand; (b) a left operand; or (c) a right operand. In some implementations, the broadcast value store comprises one or more buffers accessible for use by multiple other processor cores of the block-based processor. Additionally, in some implementations, the broadcast values are generated upon execution of an instruction in the instruction window that targets a respective one of the broadcast channels.

In still other embodiments, a broadcast value store, such as shown in FIGS. 13 and 14, is used together with the listening units of FIGS. 10 and 11. For example, the listening units of FIGS. 10 and 11 can be adapted to monitor the buffers of the broadcast value store, and copy broadcast values as appropriate. For instance, a listening unit can monitor a buffer for a broadcast channel specified by a respective instruction to detect when the buffer is populated with a broadcast value (and, in some examples, with operand type data for the broadcast value). The value can then be copied from the buffer of the broadcast value store into a corresponding buffer of the instruction window store 215. In such embodiments, the values from the broadcast value store are not provided directly to the functional units of a processor core; instead, the broadcast value store acts as a replacement for the broadcast control bus and broadcast data bus described above but still serves to provide a destination for broadcast values once they become available.

XIII. Exemplary Computing Environment

Figure 16:
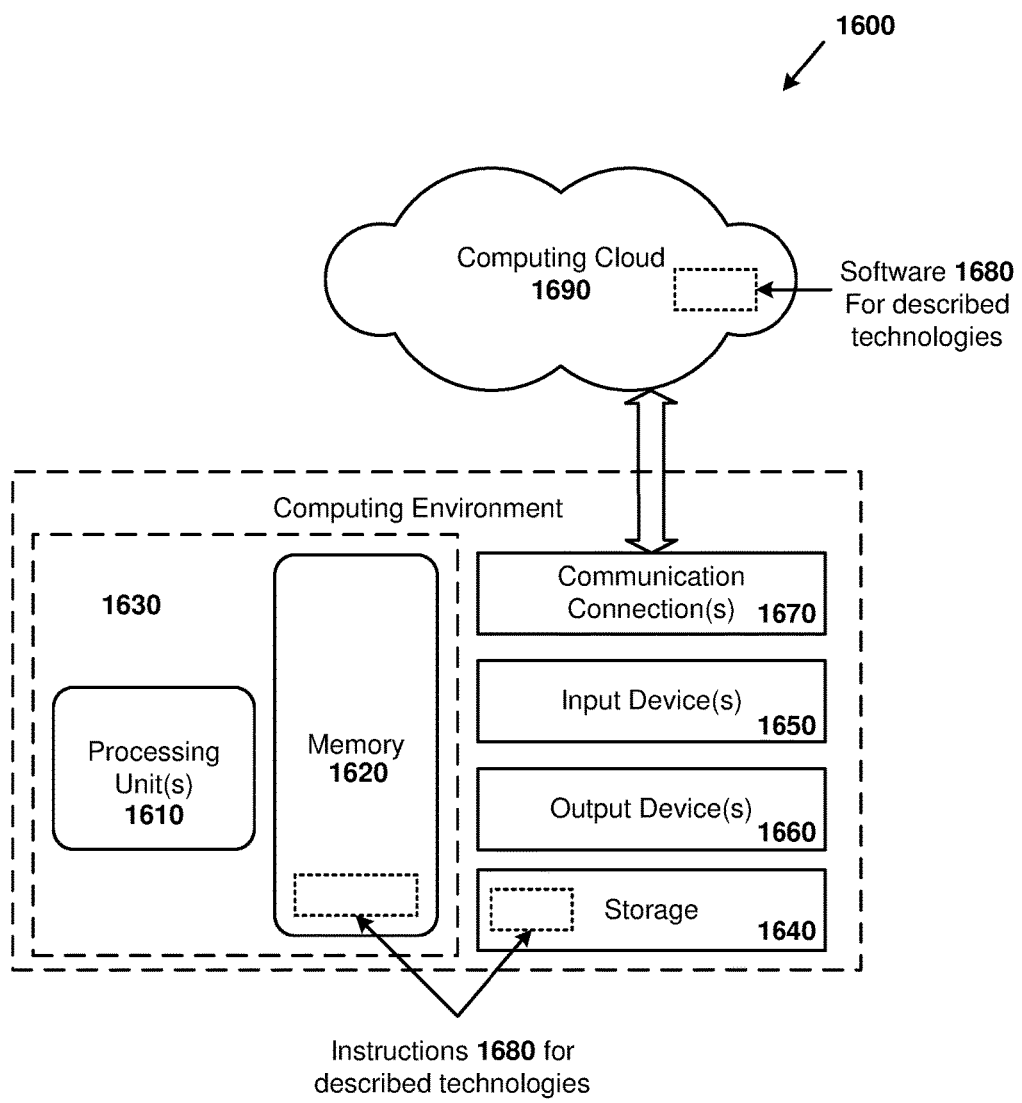
FIG. 16 illustrates a generalized example of a suitable computing environment in which described embodiments, techniques, and technologies, including configuring a block-based processor, can be implemented.

FIG. 16 illustrates a generalized example of a suitable computing environment 1600 in which certain described embodiments, techniques, and technologies, including configuring a block-based processor, can be implemented. For example, the computing environment 1600 can implement disclosed techniques for configuring a processor to operate according to one or more instruction blocks, or compile code into computer-executable instructions for performing such operations, as described herein.

The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 16, the computing environment 1600 includes at least one block-based processing unit 1610 and memory 1620. In FIG. 16, this most basic configuration 1630 is included within a dashed line. The block-based processing unit 1610 executes computer-executable instructions and may be a real or a virtual processor. In a multi-processing system, multiple processing units execute computer-executable instructions to increase processing power and as such, multiple processors can be running simultaneously. The memory 1620 may be volatile memory (e.g., registers, cache, RAM), non-volatile memory (e.g., ROM, EEPROM, flash memory, NVRAM, etc.), or some combination of the two. The memory 1620 stores software 1680, images, and video that can, for example, implement the technologies described herein. A computing environment may have additional features. For example, the computing environment 1600 includes storage 1640, one or more input device(s) 1650, one or more output device(s) 1660, and one or more communication connection(s) 1670. An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and that can be accessed within the computing environment 1600. The storage 1640 stores instructions for the software 1680, plugin data, and messages, which can be used to implement technologies described herein.

The input device(s) 1650 may be a touch input device, such as a keyboard, keypad, mouse, touch screen display, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The output device(s) 1660 may be a display, printer, speaker, CD-writer, or another device that provides output from the computing environment 1600.

The communication connection(s) 1670 enable communication over a communication medium (e.g., a connecting network) to another computing entity. The communication medium conveys information such as computer-executable instructions, compressed graphics information, video, or other data in a modulated data signal. The communication connection(s) 1670 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1690. For example, disclosed compilers and/or block-based-processor servers are located in the computing environment, or the disclosed compilers can be executed on servers located in the computing cloud 1690. In some examples, the disclosed compilers execute on traditional central processing units (e.g., RISC or CISC processors).

Computer-readable media are any available media that can be accessed within a computing environment 1600. By way of example, and not limitation, with the computing environment 1600, computer-readable media include memory 1620 and/or storage 1640. As should be readily understood, the term computer-readable storage media includes the media for data storage such as memory 1620 and storage 1640, and not transmission media such as modulated or propagating data signals per se.

XIV. Concluding Remarks

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A processor core in a block-based processor, the processor core comprising:
   at least one functional unit comprising at least one integer ALU, floating point ALU, or shift/rotate logic configured to receive one or more operands;
   an instruction window comprising buffers configured to store individual instructions for execution by the processor core; and
   circuitry controlling operation of the at least one functional unit during execution of a respective instruction,
   wherein the instruction window includes, for the respective instruction, (a) a buffer dedicated to storing the respective instruction; (b) a buffer dedicated to storing one or more operands for use by the respective instruction; and (c) a memory element or buffer that stores control bits from monitoring a broadcast control bus shared among instructions in the instruction window and, when instructed by a control signal generated from the respective instruction by the circuitry, detect values broadcast on a broadcast data bus and conditionally copies the values into the buffer dedicated to storing the operand for use by the respective instruction.

2. The processor core of claim 1, wherein the buffer dedicated to storing one or more operands for use by the respective instruction is dedicated to storing a left operand or a right operand, and wherein the memory element or buffer that stores control bits from monitoring the broadcast control bus shared among instructions in the instruction window is configured to copy the one or more values into the buffer dedicated to storing the operand when operand type data from the values broadcast on the broadcast control bus indicate that the values being broadcast on the broadcast data bus are to be used as the left operand or the right operand.

3. The processor core of claim 2, wherein the instruction window further includes, for the respective instruction to be executed by the processor core, (d) a buffer dedicated to storing a predicate operand for use by the respective instruction, and wherein the memory element or buffer that stores control bits from monitoring the broadcast control bus shared among instructions in the instruction window is further configured to conditionally copy one or more of the values from the broadcast data bus into the buffer dedicated storing the predicate operand when operand type data from the values broadcast on the broadcast control bus indicate that the values being broadcast are to be used as a predicate operand.

4. The processor core of claim 1, wherein the values broadcast on the broadcast control bus include one or more broadcast channel identifiers that identify which one of multiple available broadcast channels the values being currently broadcast on the broadcast data bus are associated with.

5. The processor core of claim 4, wherein the memory element or buffer that stores control bits from monitoring the broadcast control bus shared among instructions in the instruction window is configured to copy the one or more values into the buffer dedicated to storing the one or more operands when the broadcast channel identified by the broadcast channel identifiers matches a broadcast channel specified by the respective instruction.

6. The processor core of claim 1, wherein the memory element or buffer that stores control bits from monitoring the broadcast control bus shared among instructions in the instruction window includes a set of control memory elements, a first memory element of the set storing a bit value indicating whether the listening unit is waiting for a broadcast on the broadcast data bus and a second memory element of the set storing a bit value indicating whether the listening unit has detected and copied data from the broadcast data bus.

7. The processor core of claim 6, wherein the set of control memory elements further includes a third memory element storing one or more bit values that identify a broadcast channel for which the memory element or buffer that stores control bits from monitoring the broadcast control bus shared among instructions in the instruction window is waiting.

8. The processor core of claim 1, wherein the respective instruction includes broadcast identifier (ID) data identifying a broadcast channel for which the memory element or buffer that stores control bits from monitoring the broadcast control bus shared among instructions in the instruction window is to monitor and operand type data indicating an operand type of the data broadcast on the broadcast data bus.

9. A block-based processing system, comprising:
   a plurality of processor cores, a respective one of the processor cores comprising:
      one or more functional units comprising at least one integer ALU, floating point ALU, or shift/rotate logic to perform functions for one or more instructions,
      an instruction window comprising buffers configured to store individual instructions for execution by the processor core, the instruction window further comprising one or more operand buffers for the individual instructions configured to store operand values, and
      circuitry controlling operation of the one or more functional units during execution of a respective instruction; and
   a broadcast value store comprising a plurality of buffers dedicated to storing broadcast values, each buffer of the broadcast value store being associated with a respective broadcast channel from among a plurality of available broadcast channels.

10. The block-based processing system of claim 9, wherein the instruction window is one of a plurality of instruction windows in the respective one of the processor cores, and wherein each buffer of the broadcast store is associated with both a respective broadcast channel from among the plurality of available broadcast channels and an associated one of the plurality of instruction windows.

11. The block-based processing system of claim 9, wherein, during execution of the respective instruction, the circuitry controlling operation of the one or more functional units during execution of the respective instruction selectively fetches and sends to the one or more functional units either an operand value from one of the operand buffers in the instruction window for the instruction, or an operand value from one of the buffers of the broadcast value store, the selective use being dependent on whether the instruction specifies use of one of the broadcast channels for an operand for the instruction.

12. The block-based processing system of claim 9, wherein the buffers for the individual instruction further include a predicate operand buffer configured to store a predicate operand value, and wherein the circuitry controlling operation of the one or more functional units during execution of the respective instruction is configured to selectively use as a predicate for the individual instruction either a predicate value from the predicate operand buffer or a predicate value from one of the buffers of the broadcast value store, the selective use being dependent on whether the individual instruction specifies use of one of the broadcast channels for an operand for the individual instruction and also whether an operand type value at the specified one of the broadcast channels indicates that the channel is for a predicate operand.

13. The block-based processing system of claim 9, wherein at least some of the broadcast values stored in the broadcast value store are available for operand use to all instructions in the instruction window.

14. The block-based processing system of claim 9, wherein the broadcast values stored in a buffer of the broadcast value store include operand type values indicative of an operand type for the data in the buffer of the broadcast value memory.

15. The block-based processing system of claim 14, wherein multiple operand types can be specified by the operand type values, and wherein the multiple operand types include two or more of: (a) a predicate operand; (b) a left operand; or (c) a right operand.

16. The block-based processing system of claim 9, wherein the broadcast value store comprises one or more buffers accessible for use by multiple other processor cores of the block-based processor.

17. The block-based processing system of claim 9, wherein the broadcast values are generated upon execution of an instruction in the instruction window that targets a respective one of the broadcast channels.

18. A method, comprising:
in a processor core of a block-based processor,
decode an instruction from an instruction window store storing a block of instructions, the decoding including decoding a broadcast identification field indicating whether or not the instruction uses data on a broadcast channel for one or more operands;
when the broadcast identification field indicates that the instruction is to use data on a broadcast channel, retrieving data from a buffer associated with the broadcast channel, the buffer being part of a broadcast value store separate from the instruction window store storing the block of instructions but within the processor core of the block-based processor;
when the broadcast field indicates that the instruction is not to use data on the broadcast channel, retrieving operand data only from one or more buffers of the instruction window store that are associated with the instruction.

19. The method of claim 18, further comprising, when the broadcast identification field indicates that the instruction is to use the data on the broadcast channel:
retrieving operand type data associated with the data on the broadcast channel; and
applying the operand data during execution of the instruction in accordance with the operand type data received.

20. The method of claim 18, wherein the instruction window store is one of a plurality of instruction window stores, each storing a different block of instructions, and wherein each buffer of the broadcast value store is dedicated to a respective broadcast channel for a respective instruction window store of the processor core.

* * * * *